(12) United States Patent
Smith et al.

(10) Patent No.: US 7,953,682 B2
(45) Date of Patent: May 31, 2011

(54) METHOD OF DRIVING A DISPLAY USING NON-NEGATIVE MATRIX FACTORIZATION TO DETERMINE A PAIR OF MATRICES FOR REPRESENTING FEATURES OF PIXEL DATA IN AN IMAGE DATA MATRIX AND DETERMINING WEIGHTS OF SAID FEATURES SUCH THAT A PRODUCT OF THE MATRICES APPROXIMATES THE IMAGE DATA MATRIX

(75) Inventors: Euan Christopher Smith, Cambridgeshire (GB); Paul Richard Routley, Cambridge (GB); Clare Louise Foden, Cambridge (GB)

(73) Assignee: Cambridge Display Technology Limited (GB)

( * ) Notice: Subject to any disclaimer, the term of this patent is extended or adjusted under 35 U.S.C. 154(b) by 1045 days.

(21) Appl. No.: 10/578,659

(22) PCT Filed: Nov. 30, 2005

(86) PCT No.: PCT/GB2005/050219
§ 371 (c)(1),
(2), (4) Date: May 9, 2006

(87) PCT Pub. No.: WO2006/067520
PCT Pub. Date: Jun. 29, 2006

(65) Prior Publication Data
US 2008/0291122 A1      Nov. 27, 2008

(30) Foreign Application Priority Data
Dec. 23, 2004   (GB) .................................. 0428191.1

(51) Int. Cl.
*G06F 15/18* (2006.01)
*G06F 3/038* (2006.01)
*G09G 5/00* (2006.01)
*G09G 5/39* (2006.01)

(52) U.S. Cl. .......... 706/25; 345/643; 345/644; 345/530; 345/204

(58) Field of Classification Search ...................... 706/25
See application file for complete search history.

(56) References Cited

U.S. PATENT DOCUMENTS
3,621,321 A    11/1971   Williams et al.
(Continued)

FOREIGN PATENT DOCUMENTS
EP              0541295 A2    5/1993
(Continued)

OTHER PUBLICATIONS
Lee et al., Learning the parts of objects by non-negative matrix factorization, 1999.*
(Continued)

*Primary Examiner* — Donald Sparks
*Assistant Examiner* — Nathan H Brown, Jr.
(74) *Attorney, Agent, or Firm* — Schwegman, Lundberg & Woessner, P.A.

(57) ABSTRACT

This invention generally relates to methods, apparatus and computer program code processing digital data using non-negative matrix factorisation.

A method of digitally processing data in a data array defining a target matrix (X) using non-negative matrix factorisation to determine a pair of matrices (F, G), a first matrix of said pair determining a set of features for representing said data, a second matrix of said pair determining weights of said features, such that a product of said first and second matrices approximates said target matrix, the method comprising: inputting said target matrix data (X); selecting a row of said one of said first and second matrices and a column of the other of said first and second matrices; determining a target contribution (R) of said selected row and column to said target matrix; determining, subject to a non-negativity constraint, updated values for said selected row and column from said target contribution; and repeating said selecting and determining for the other rows and columns of said first and second matrices until all said rows and columns have been updated.

36 Claims, 13 Drawing Sheets

U.S. PATENT DOCUMENTS

| | | | |
|---|---|---|---|
| 4,539,507 | A | 9/1985 | VanSlyke et al. |
| 4,672,265 | A | 6/1987 | Eguchi et al. |
| 5,172,108 | A | 12/1992 | Wakabayashi et al. |
| 5,247,190 | A | 9/1993 | Friend et al. |
| 5,646,652 | A | 7/1997 | Saidi |
| 5,654,734 | A | 8/1997 | Orlen et al. |
| 5,684,502 | A | 11/1997 | Fukui et al. |
| 5,747,182 | A | 5/1998 | Friend et al. |
| 5,807,627 | A | 9/1998 | Friend et al. |
| 5,821,690 | A | 10/1998 | Martens et al. |
| 5,874,932 | A | 2/1999 | Nagaoka et al. |
| 5,886,755 | A | 3/1999 | Imoto et al. |
| 5,900,856 | A | 5/1999 | Lino et al. |
| 5,965,901 | A | 10/1999 | Heeks et al. |
| 6,014,119 | A | 1/2000 | Staring et al. |
| 6,151,414 | A | 11/2000 | Lee et al. |
| 6,201,520 | B1 | 3/2001 | Iketsu et al. |
| 6,332,661 | B1 | 12/2001 | Yamaguchi |
| 6,366,026 | B1 | 4/2002 | Saito et al. |
| 6,429,601 | B1 | 8/2002 | Friend et al. |
| 6,496,168 | B1 | 12/2002 | Tomida |
| 6,501,226 | B2 | 12/2002 | Lai et al. |
| 6,558,219 | B1 | 5/2003 | Burroughes et al. |
| 6,558,818 | B1 | 5/2003 | Samuel et al. |
| 6,605,823 | B1 | 8/2003 | Pichler et al. |
| 6,678,319 | B1 | 1/2004 | Jamali |
| 6,771,235 | B2 | 8/2004 | Ishizuka et al. |
| 6,806,857 | B2 | 10/2004 | Sempel et al. |
| 6,832,729 | B1 | 12/2004 | Perry et al. |
| 6,897,473 | B1 | 5/2005 | Burroughes et al. |
| 7,049,010 | B1 | 5/2006 | Holmes et al. |
| 7,078,251 | B2 | 7/2006 | Burroughes et al. |
| 7,125,952 | B2 | 10/2006 | O'Dell et al. |
| 7,151,341 | B2 | 12/2006 | Pichler et al. |
| 7,327,358 | B2 | 2/2008 | Tajiri et al. |
| 2001/0040536 | A1 | 11/2001 | Tajima et al. |
| 2002/0024513 | A1 | 2/2002 | Kota et al. |
| 2002/0033782 | A1 | 3/2002 | Ogusu et al. |
| 2002/0054266 | A1 | 5/2002 | Nishimura |
| 2002/0063671 | A1 | 5/2002 | Knapp |
| 2002/0083655 | A1 | 7/2002 | Paul et al. |
| 2002/0097211 | A1 | 7/2002 | Yasunishi et al. |
| 2002/0158832 | A1 | 10/2002 | Park et al. |
| 2003/0018604 | A1 | 1/2003 | Franz et al. |
| 2003/0030608 | A1 | 2/2003 | Kurumisawa et al. |
| 2003/0048238 | A1 | 3/2003 | Tsuge et al. |
| 2003/0128225 | A1 | 7/2003 | Credelle et al. |
| 2003/0189579 | A1 | 10/2003 | Pope |
| 2003/0193463 | A1 | 10/2003 | Yamada et al. |
| 2004/0021654 | A1 | 2/2004 | Mas et al. |
| 2004/0066363 | A1 | 4/2004 | Yamano et al. |
| 2004/0125046 | A1 | 7/2004 | Yamazaki et al. |
| 2004/0145553 | A1 | 7/2004 | Sala et al. |
| 2004/0150608 | A1 | 8/2004 | Kim et al. |
| 2004/0169463 | A1 | 9/2004 | Burn et al. |
| 2004/0249615 | A1 | 12/2004 | Grzeszczuk et al. |
| 2005/0021333 | A1 | 1/2005 | Smaragdis |
| 2005/0057462 | A1 | 3/2005 | Kota et al. |
| 2005/0110720 | A1 | 5/2005 | Akimoto et al. |
| 2005/0123053 | A1 | 6/2005 | Cooper et al. |
| 2005/0190119 | A1 | 9/2005 | Yamazaki et al. |
| 2005/0218791 | A1 | 10/2005 | Kawase |
| 2006/0001613 | A1 | 1/2006 | Routley et al. |
| 2006/0050032 | A1 | 3/2006 | Gunner et al. |
| 2006/0214890 | A1 | 9/2006 | Morishige et al. |
| 2007/0046603 | A1 | 3/2007 | Smith et al. |
| 2007/0069992 | A1 | 3/2007 | Smith et al. |
| 2007/0076869 | A1 | 4/2007 | Mihcak et al. |
| 2007/0085779 | A1 | 4/2007 | Smith et al. |
| 2008/0246703 | A1 | 10/2008 | Smith |
| 2008/0291122 | A1 | 11/2008 | Smith et al. |
| 2009/0128459 | A1 | 5/2009 | Smith |
| 2009/0128571 | A1 | 5/2009 | Smith et al. |

FOREIGN PATENT DOCUMENTS

| | | | |
|---|---|---|---|
| EP | 0581255 | A1 | 2/1994 |
| EP | 0621578 | A | 10/1994 |
| EP | 0678844 | A1 | 10/1995 |
| EP | 1079361 | A1 | 2/2001 |
| EP | 1091339 | A2 | 4/2001 |
| EP | 1408479 | A2 | 4/2004 |
| EP | 1457958 | A2 | 9/2004 |
| GB | 2371910 | A | 8/2002 |
| GB | 2381643 | A | 5/2003 |
| GB | 2388236 | A1 | 11/2003 |
| GB | 2389951 | A | 12/2003 |
| GB | 2389952 | A1 | 12/2003 |
| JP | 10-260659 | A | 9/1998 |
| JP | 2002-258805 | A | 9/2002 |
| JP | 2002-342842 | A | 11/2002 |
| JP | 2003-084732 | A | 3/2003 |
| JP | 2003-108082 | A | 4/2003 |
| JP | 2004-133138 | A | 4/2004 |
| WO | WO-9013148 | A1 | 11/1990 |
| WO | WO-94/27276 | A1 | 11/1994 |
| WO | WO-95/04986 | A1 | 2/1995 |
| WO | WO-9506400 | A1 | 3/1995 |
| WO | WO-9921935 | A1 | 5/1999 |
| WO | WO-9948160 | A1 | 9/1999 |
| WO | WO-02067343 | A1 | 8/2002 |
| WO | WO-03079322 | A1 | 9/2003 |
| WO | WO-03091983 | A1 | 11/2003 |
| WO | WO-03094140 | | 11/2003 |
| WO | WO-2004001707 | A2 | 12/2003 |
| WO | WO-2004003877 | A2 | 1/2004 |
| WO | WO-2006035246 | A1 | 4/2006 |
| WO | WO-2006035248 | A1 | 4/2006 |

OTHER PUBLICATIONS

"United Kingdom Search Report for Application No. GB0524337.3", 1 Page.

Lee, Daniel D., et al., "Algorithms for Non-negative Matrix Factorization", *Advances in Neural Information Processing Systems*, vol. 13, (2001), 556-562.

Lee, Daniel D., et al., "Learning the parts of objects by non-negative matrix factorization", *Nature*, vol. 401, (Oct. 1991), 788-791.

Lui, Wenguo, et al., "Existing and new algorithms for non-negative matrix factorization", http://www.cs.utexas.edu/users/liuwg/383Cproject/CS_383C_Project.htm, (2002).

Shahnaz, Farial, et al., "Document clustering using nonnegative matrix factorization", *Information Processing and Management*, (2004),14 Pages.

Tangsrirat, W., et al., "FTFN with variable current gain", *Proceedings of IEEE Region 10 International Conference on Electrical and Electronic Technology, 2001. TENCON.*, vol. 1, (2001), 209-212.

Vogt, Frank, et al., "Revent advancements in chemometrics for smart sensors", *Analyst*, vol. 129, (2004), 492-502.

PCT Application Serial No. PCT/GB2005/050219, International Search Report mailed Feb. 20, 2008, 3 pgs.

Berry, M. W., et al., "Algorithms and Applications for Approximate Nonnegative Matrix Factorization", *Computational Statistics & Data Analysis*, 52, (2007), 155-173.

Chu, M., et al., "Optimality, Computation, and Interpretation of Nonnegative Matrix Factorizations", [online]. Version: Oct. 18, 2004. [retrieved Feb. 6, 2008]. Retrieved from the Internet: <URL: http://www.wfu.edu/{plemmons/papers/chu_ple.pdf>, (2004), 18 pgs.

Eisenbrand, F., et al., "Algorithms for Longer OLED Lifetime", *Proceedings, 6th Workshop on Experimental Algorithms (WEA 2007), Lecture Notes in Computer Science*, vol. 4525, (2007), 338-351.

Smith, E. C., "8.3: Total Matrix Addressing (TMA™)", *International Symposium Digest of Technical Papers (SID 2007)*, (2007), 93-96.

Tropp, J. A., "Literature Survey: Non-Negative Matrix Factorization", [online]. Preprint, University of Texas at Austin. [retrieved Feb. 7, 2008]. Retrieved from the Internet: <URL: http://www.acm.caltech.edu/{jtropp/notes/Tro03-Literature-Survey.pdf>, (2003), 10 pgs.

PCT Application Serial No. PCT/GB2005/050219, Written Opinion mailed Feb. 20, 2008, 17 pgs.

"U.S. Appl. No. 10/578,941, Non-Final Office Action mailed Dec. 23, 2008", 36 pgs.

"U.S. Appl. No. 10/578,941, Final Office Action mailed Aug. 5, 2009", 19 pgs.

"U.S. Appl. No. 10/578,941, Response filed Apr. 21, 2009 to Non Final Office Action mailed Dec. 23, 2008", 18 pgs.

"U.S. Appl. No. 10/578,941, Response filed Oct. 27, 2009 to Final Office Action mailed Aug. 5, 2009", 11 pgs.

"U.S. Appl. No. 10/578,941, Non-Final Office Action mailed Jan. 21, 2010", 21 Pgs.

"U.S. Appl. No. 10/578,786, Final Office Action mailed Oct. 7, 2009", 29 pgs.

"U.S. Appl. No. 10/578,786, Non-Final Office Action mailed on Dec. 8, 2008", 58 pgs.

"U.S. Appl. No. 10/578,786, Preliminary Amendment filed May 9, 2006", 11 pgs.

"U.S. Appl. No. 10/578,786, Response filed Feb. 5, 2010 to Final Office Action mailed Oct. 7, 2009", 18 pgs.

"U.S. Appl. No. 10/578,786, Response filed Apr. 7, 2009 to Non Final Office Action mailed Dec. 8, 2008", 27 pgs.

"U.S. Appl. No. 10/578,941 Final Office Action mailed Jul. 12, 2010", 19 pgs.

"U.S. Appl. No. 10/578,941, Preliminary Amendment filed Mar. 23, 2007", 3 pgs.

"U.S. Appl. No. 10/578,941, Response filed Apr. 22, 2010 to Non Final Office Action mailed Jan. 21, 2010", 11 pgs.

"Great Britain Application Serial No. GB0421712.1, Search Report dated Dec. 31, 2004", 1 pg.

"International Application Serial No. PCT/GB2005/050169, International Search Report and Written Opinion mailed Feb. 7, 2006", 6 pgs.

"International Application Serial No. PCT/GB2005/050167, International Search Report mailed Jan. 17, 2007", 2 pgs.

"International Application Serial No. PCT/GB2005/050167, Written Opinion mailed Jan. 17, 2007", 7 pgs.

Guillamet, D., et al., "Non-negative Matrix Factorizeration for Face Recognition", Lecture Notes in Computer Science, vol. 2504/2002—Topics in Artificial Intelligence: 5th Catalonian Conference on AI (CCIA 2002), (2002), 336-344.

Routley, P. R., et al., "Display Driver Circuits", Great Britain Application Serial No. GB20020013989.7, filed Jun. 18, 2002, 56 pgs.

* cited by examiner

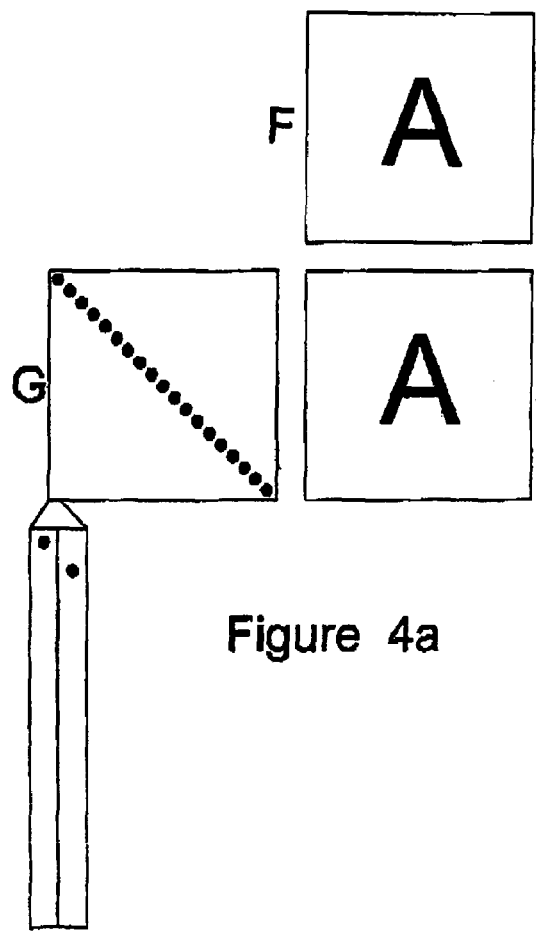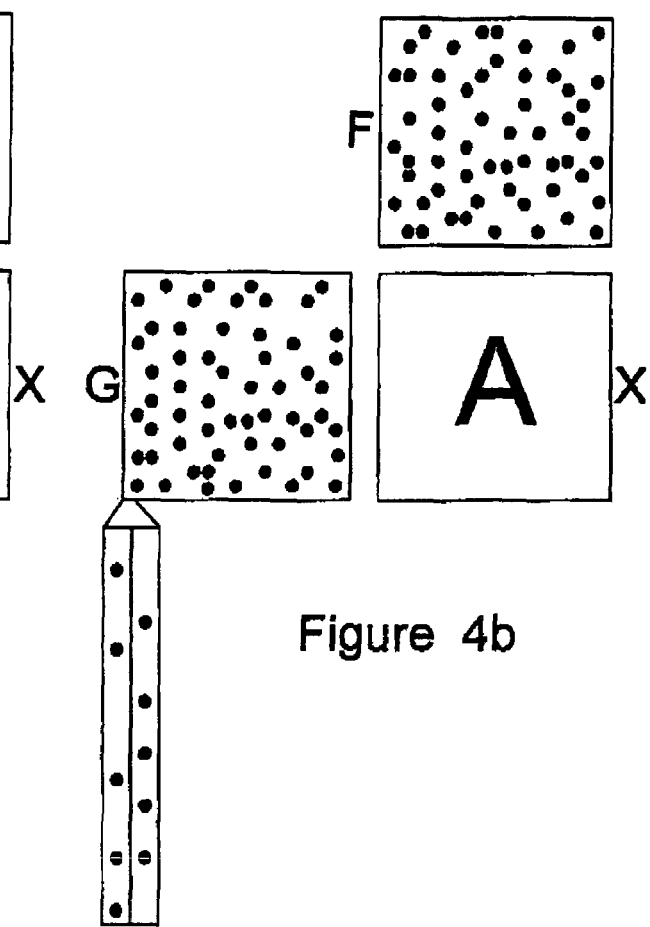
Figure 4a
Figure 4b
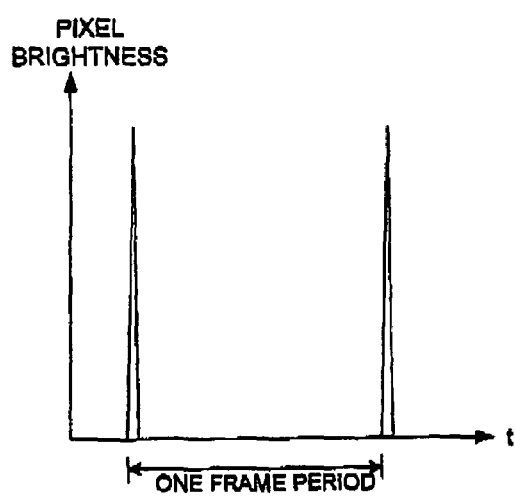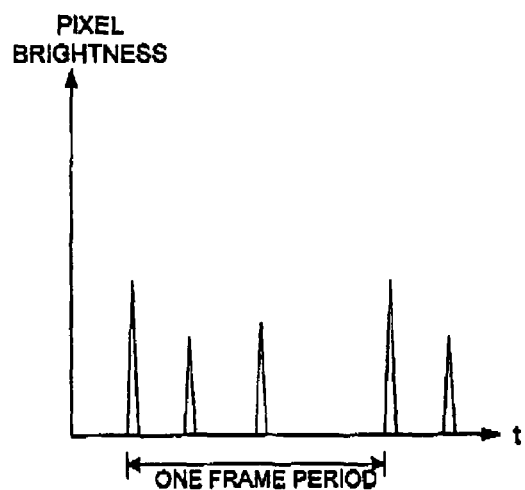
Figure 4c
Figure 4d

METHOD OF DRIVING A DISPLAY USING NON-NEGATIVE MATRIX FACTORIZATION TO DETERMINE A PAIR OF MATRICES FOR REPRESENTING FEATURES OF PIXEL DATA IN AN IMAGE DATA MATRIX AND DETERMINING WEIGHTS OF SAID FEATURES SUCH THAT A PRODUCT OF THE MATRICES APPROXIMATES THE IMAGE DATA MATRIX

CLAIM OF PRIORITY

This application is a U.S. National Stage Filing under 35 U.S.C. 371from International Patent Application No. PCT/GB2005/050219, filed Nov. 30, 2005, which claimed priority under 35U.S.C. 119 to United Kingdom Application No. 0428191.1, filed Dec. 23, 2004, which applications are incorporated herein by reference and made a part hereof.

This invention generally relates to methods, apparatus and computer program code processing digital data using non-negative matrix factorisation; embodiments of the invention are particularly applicable to multi-line addressing (MLA) techniques for displays such as passive-matrix OLED (organic light emitting diode) displays.

Techniques for feature analysis (decomposing data to weighted sets of features) include vector quantisation (VQ), principle components analysis (PCA) and non-negative matrix factorisation (NMF). Broadly speaking vector quantisation aims to identify a set of prototypical features which can be used to represent data by identifying the prototypical feature from the set to which it most closely corresponds. Principle components analysis aims to construct a set of orthogonal basis functions which can then be combined to represent the data. Vector quantisation is inappropriate for many applications as it does not attempt to exactly reproduce data, rather it finds the closest match from the set of prototypical features. Principal component analysis, and other techniques such as singular value decomposition (SVD) suffer from the disadvantage that the prototypical or basis functions can be negative and thus tend to lack any physical reality. By contrast non-negative matrix factorisation is a technique in which a target matrix is decomposed into a pair of factor matrices which when multiplied together approximate the target, under the constraint that negative entries in the factor matrices are not permitted. Because of this the features and their weights tend to correspond to practically useful and recognisable elements. For example the application of these three techniques to decomposing images of faces is contrasted in "Learning the Parts of Objects by Non-Negative Matrix Factorisation", D. D. Lee and H. S. Seung, Nature, Vol 401, 21 Oct. 1999, pages 788-791.

Non-negative matrix factorisation has further advantages in that the procedure is relatively simple, however implementation of the procedure using technical means such as digital signal processing hardware is hampered because the procedure is iterative and can be very slow to converge for large datasets. It is therefore inappropriate for many practical applications, particularly those which require calculation in real time. So called "diagonalised" NMF techniques restrict to a diagonally biased solution (row driving scheme) which results in faster convergence but provides little benefit in the context of a multi-line addressing scheme.

We have previously described, in UK Patent Application No. 0421712.1, filed 30 Sep. 2004, how non-negative matrix factorisation techniques may be employed to provide improved multi-line addressing for displays, in particular OLED displays. Other related background material can be found in UK Patent Applications Nos. 0421711.3 and 0421710.5, both filed 30 Sep. 2004. The contents of all three of these applications are hereby incorporated in their entirety by reference.

To facilitate the application of NMF techniques to multi-line addressing improved digital signal processing techniques for NMF are desirable. We will describe such techniques with specific reference to their application to OLED display driving; however it will be appreciated that the techniques are not limited to such applications.

According to a first aspect of the invention there is therefore provided a method of digitally processing data in a data array defining a target matrix (X) using non-negative matrix factorisation to determine a pair of matrices (F, G), a first matrix of said pair determining a set of features for representing said data, a second matrix of said pair determining weights of said features, such that a product of said first and second matrices approximates said target matrix, the method comprising: inputting said target matrix data (X); selecting a row of said one of said first and second matrices and a column of the other of said first and second matrices; determining a target contribution (R) of said selected row and column to said target matrix; determining, subject to a non-negativity constraint, updated values for said selected row and column from said target contribution; and repeating said selecting and determining for the other rows and columns of said first and second matrices until all said rows and columns have been updated.

Broadly speaking in embodiments by updating values of the first and second matrix row-column by row-column simplified signal processing can be employed. The target contribution of each selected row and column is, broadly speaking, the difference between the target matrix and the combination of weighted features determined from the product of all the other rows and columns of the pair of matrices (and thus the target contribution is a matrix of the same size as the target matrix). In other words the target contribution is the sum of the weighted features for all the features except the feature (and weight) defined by the selected row and column. It will be appreciated that it is immaterial which matrix is labelled the first matrix and which the second matrix; however at the completion of one cycle of the method all the elements of both the matrices (that is, each column of one and each row of the other) have preferably been updated.

In embodiments the data exists in a number of sets, and the target comprises data from each set on one or more axes, and properties of the data (for example a set of types, classification or reduced parameter analysis) on another axis. In embodiments the properties are additive so that a sum of a component or property across multiple sets is meaningful.

Preferably the data in the data array represents a physical entity; it may be provided on a data carrier such as any type of volatile or non-volatile storage medium. Some examples of this data are given below (the list is non-exhaustive):

1. Face or other image matching/recognition—the data is image data, the features comprising parts of the target, for example parts of images of faces, comprising, for example, a set of column vectors each carrying data for a two-dimensional image. This is described further in, for example, "Fisher Non-Negative Matrix Factorisation for Learning Local Features", Y. Wang, Y. Jia, C. Hu and M. Turk; "Face Recognition with Non-Negative Matrix Factorisation", M. Rajapakase and L. Wyse, Prock. SPIE Vol 5150, pages 1838-1847, Visual Communications and Image Processing 2003, T. Ebrahimi and T. Sikora (Editors).

2. Network security—the data comprises, for example, user activity data (or user profile data). For example a semantic representation of a user's profile may be constructed by means of content—based text filtering (see, for example, "A NMF-based Method for Constructing User Profile", H. Gangshi, Z. Yafei, L. Jianjiang and X. Jiang, Journal of the China Society for Scientific and Technical Information, Vol 23, No 4, August 2004. The network may comprise any type of data network including (but not limited to) wired and wireless networks, telecommunications networks, computer data networks and other types of networks. The extracted features may comprise, for example, typical activity patterns and/or be classified into potentially fraudulent and non-fraudulent patterns of activity.

3. Data mining—the data comprises stored data in a database and/or multivariate data, embodiments of the method being used, for example, to provide a reduced representation of the input data by, say, creating a user-defined number of features. Broadly speaking data in a database is mapped by an NMF procedure onto a set of attributes or features discovered by the procedure. In this way, for example, unstructural text data may be mined by factorising a document-term matrix. In this way a form of latent semantic analysis may be performed, for example by comparing vectors for two (preferably adjoining) segments of text in a high-dimensional semantic space to characterise a degree of semantic relatedness between the segments. For example, feature extraction can be used to extract the themes of a document collection, where documents are represented by a set of key words and their frequencies. Each theme (feature) is represented by a combination of keywords. The documents in the collection can then be expressed in terms of the discovered themes. It will be appreciated that positive values may represent, for example an average frequency of a term (or group of terms) across a set of documents; a factor analysis method which gave negative results would not be meaningful.

4. Sensor data processing—the data comprises sensor data such as chemometric data, hyperspectral or other spectroscopic/imaging data, surface plasmon resonance data, excitation—emission matrix spectroscopy data, optical derivative spectroscopy data and the like (see, for example, "Recent Advancements in Chemometrics for SMART Sensors", F. Vogt, B. Dable, J. Cramer and K. Booksh, Analyst, 2004, Vol 129, pages 492-502, and references therein to iterative multivariate curve resolution using ALS, alternating leased squares; see also "Feature Extraction of MERIS Data", V. Tsagarigs and V. Anastassopoulos, Esanvat Symposium VI—10 Sep. 2004, Saltzburg, Austria, Poster Session 2P13"). The features may then comprise physically meaningful components of the spectra, for example contributions of components to a spectrum (and/or of an image).

5. Biological sequence analysis—data comprises biological sequence data such as gene, proteome, nucleotide, or amino acid sequence data, or microarray data, for example for matching features (portions of sequences) between different fragments of a sequence and/or between portions of data corresponding to localised features in expression space (see, for example, "Subsystem Identification though Dimensionality Reduction of Large-Scale Gene Expression Data", P. M. Kim and B. Tidor, Genome Research, Vol 13, pages 1706-1718, 2003). Alternatively, the data may comprise other biological data such as atomic coordinate data, for example for ligand-receptor binding or interaction site identification.

6. Machine learning/recognition techniques—data comprises data describing objects or parts of objects to be recognised (objects here may be tangible, or intangible data objects), such as image data, sound data, text/word data (for analysis) or the like (see, for example, "Non-negative Matrix Factorisation on a Possible Way to Learn Sound Dictionaries", H. Asari, Watson School of Biological Sciences, Bold Spring Harbor Laboratory, 15 Apr. 2004 (http://zadorlab.cshl.edu/asari/nmf.html). The number of attributes or dimensions of the original data is preferably reduced by the NMF procedure, thus facilitating learning.

7. Data analysis/pattern recognition—the data comprises the data for analysis, for example a list of document references for search result cluster analysis and/or web searching (see, for example, "Dimensionality Reduction Techniques for Search Results Clustering", S. Osinski, MSC in Advanced Software Engineering, Department of Computer Science, University of Sheffield, UK, 20 Aug. 2004), or word alignment data for performing or verifying machine translation (see, for example, "Aligning Words using Matrix Factorisation", C. Goutte, K. Yamada and E. Gaussier, http://acl.ldc.upenn.edu/ac12004/main/pdf/187_pdf_2-col.pdf). This may be used to reduce the data not to search through, for example, by selecting based upon features prior to searching. The feature-based selecting (pre-filtering) may comprise selecting documents based on a set of classifications to, say, identify all documents relating to a particular topic, geographical region or the like. Here (as elsewhere in this specification) documents may include multimedia material and the like.

Other classification-type applications include classification of personal data, for example, buying habits, responses to questionnaires (e.g. consumer surveys, census data, psychometric questionnaires), financial activities—spotting fraud (for example, data on benefit claimants), and the like.

To expand on specific examples, a supermarket may use embodiments of the method to predict a minimum number of classifications which describe the buying habits of their customers based on loyalty card data. This can be used to target promotions and/or other marketing activities at specific groups. Responses to questionnaires could be similarly analysed, for example producing a minimum subset which accurately reproduces the majority of a group's responses. These classifications may then be examined to investigate patterns in attitudes or behaviours. Also, as previously mentioned patterns of behaviour, if individual occurrences can be quantified (for example benefit claims), can be classified and, potentially, aid the identification of possible fraud.

The techniques described herein may be used on a representative (e.g. pseudo-random) selection of data sets or documents to determine a set of features, and then applied to a large group of data, for increased speed.

Applications of feature extraction also include data compression, data decomposition and projection, and pattern recognition. Feature extraction can also be used to enhance the speed and effectiveness of supervised learning.

In one preferred embodiment of the method the data comprises data for an image to be displayed (the physical entity represented by the data may be considered as an image stored as an electrical signal). One particular advantage of embodiments of the described method for this (and other) applications is the great improvement in processing speed which is obtainable, typically an improvement by a factor of between 20 and 40 over conventional techniques. This makes embodiments of the method suitable, for example, for implementing multi-line addressing schemes when displaying real-time video.

In a preferred embodiment of the method the determining of updated values comprises determining new values for the selected row and column substantially independent of previous values of the respective row and column (a row/column defining a vector with a plurality of elements). In general the (vector) value of a row/column is independent of its previous value although it is possible that the previous value of a row/column may be incorporated into a weighting factor (as described further later) determining a degree of convergence of successive iterations of the method, so appearing as a second order contribution.

Preferably the determining of a target contribution comprises determining a difference between a target matrix X and a sum of weighted features determined by multiplying each other row than the selected row by each respective other column than the selected column of the pair of matrices.

It will be appreciated that where a target matrix is large it may be sub-divided and the method applied (preferably in parallel) to each separate portion of the target matrix. For example a large display may be divided into four quadrants and the technique applied separately to each quadrant.

Preferably the determining of updated values comprises calculating values of $G_{ia}=f_1(R,F)$ and $F_{au}=f_2(R,G)$ where R is a matrix with I rows and U columns, F is a matrix with A rows and U columns and G is a matrix with I rows and A columns, where $f_1$ and $f_2$ denote first and second functions, and where $G_{ia}$ denotes a data element in the ith row and ath column of G and $F_{au}$ denotes a data element in the ath row and uth column of F. Preferably $f_1$ and $f_2$ are selected to minimise a cost function measuring a quality of approximation of a product of the selected row and column to the target contribution. This cost function may comprise a squared Euclidean distance, or a divergence function, or some other cost function.

In one preferred embodiment $G_{ia}$ and $F_{iu}$ are determined in accordance with:

$$G_{ia} = \frac{\sum_{u=1}^{U} R_{iu} F_{au} \Phi_{iu}}{\sum_{u=1}^{U} F_{au}^2 \Phi_{iu}},$$

$$F_{au} = \frac{\sum_{i=1}^{I} G_{ia} R_{iu} \Phi_{iu}}{\sum_{i=1}^{I} G_{ia}^2 \Phi_{iu}}$$

where $R_{iu}$ denotes a data element in the ith row and uth column of R, where R is given by:

$$R_{IU} = X_{IU} - \sum_{n=1}^{A, n \neq a} G_{In} F_{nU}$$

and where $\Phi_{iu}$ denotes a data element in the ith row and uth column of an I by U matrix $\Phi$. Where a Euclidean cost function is employed $\Phi_{iu}$ is substantially unity for all i and u. In another embodiment $\Phi_{iu}$ has the form $\Phi_{iu}=1/(Z_{iu}+\gamma)$ where $Z_{iu}$ denotes a data element in the ith row and uth column of an I by U matrix dependent upon at least one of X and R, and $\gamma$ is positive constant less than one, preferably less than 0.1, more preferably less than 0.01.

In some preferred embodiments A is less than the smaller of I and U. In a display application A maybe equated with a "multiplex ratio", which describes a factor by which a number of row drive epochs may be reduced in a passive matrix display as compared with the number of row drive epochs required when driving each row separately. For example a 240 line (monochrome) screen would conventionally require 240 separate row drive epochs but with, say, A=36 only 36 (multiline) row drive epochs are required, each defining (with a set of column drive signals) a subframe which builds up over a frame period to produce the desired image. Thus the peak drive is significantly reduced and since (for an OLED display) the peak drive is closely related to both device efficiency and lifetime, display lifetime and/or power consumption may be substantially improved. Taking into account that with multi-line addressing techniques a sequence of subframes contribute to the overall perceived brightness of a pixel, the effective multiplex ratio of a displayed image may be still lower than the parameter A. For example a 240 line display with A=120 may have an effective multiplex ratio of 23, resulting in a theoretical reduction in power consumption from approximately 100 W (due largely to the high voltages required for a multiplex ratio of 240 combined with display capacitance) to around 2 W and approximately a ten-fold increase in display lifetime as compared with a conventional passive-matrix drive scheme in which one row is driven at a time using pulse modulation. Alternatively benefits could be gained from allowing access to higher display luminances and/or larger display formats or resolutions. Furthermore trade-offs can be made between such specifications as resolution, size, luminance, lifetime and power consumption for a display to better meet the requirements of the target application. (The skilled person will appreciate that here the reference to "subframes" refers to one of a sequence of frames in time which when combined give the impression of the desired image, rather than to a spatial subdivision of the image, although such a spatial subdivision may additionally be employed).

The method may further comprises initialising the first and second matrices, for example each to a substantially uniform value so that they combine to give an overall average value for the target matrix, in the case of a display an average brightness and/or colour value. However in other embodiments of the method, for example where the method is repeatedly applied to a sequence of slowly changing data arrays/target matrices, the previous values for the first and second matrices may be used as the basis for determining new values of these matrices. This technique may be used, for example, for determining matrices for displaying video data. However sometimes a stream of images defining a moving picture can have abrupt changes, for example from one scene to another and thus the initialising may be conditional upon a degree of difference between a current image and a previous image. This may be determined by determining a difference between a current and previous image or by determining a difference between a current image and an image approximated by a combination of the above mentioned first and second matrices.

Preferably the non-negativity constraint is a hard constraint, for example implemented by setting an updated row/column value to substantially zero where the updated value would otherwise be negative. The skilled person will readily appreciate the need for all matrix elements of the first and second matrices to be either zero or positive when these matrices are being used to drive an emissive display, since a "negative" emission is not practically implementable (the target contribution, R, may however be negative). Preferably the updated values are constrained by one or preferably both of a lower and upper limit to avoid division by small numbers adversely affecting the updating process.

As previously mentioned, embodiments of the method converge extremely fast on the desired target but nonetheless generally two or more iterations of the method will be applied. Either a fixed number of iterations may be employed (providing a bound to the processing time which may be useful for some applications such as video) or the method may be iterated until there is substantially no change in the first and second matrices or until these change by less than a threshold amount, or until an error or cost function is less than a threshold value. As described in more detail later in embodiments of the method speed of convergence is controlled by a weighting factor, which may be adjusted as convergence proceeds and/or dependent upon one or more values in the target matrix (for example to provide better convergence for pixels driven at a low level) and/or dependent upon pixel colour (since the human eye is able to perceive smaller changes in green brightness than in red or blue brightness).

Where the method is used for driving a display the display preferably comprises an electro-optic display more particularly an emissive display, such as an OLED display, especially a passive-matrix OLED display, an inorganic LED display or a plasma display. Thus in one preferred embodiment of the method row and column drives for a display are derived from values in the first and second (factor) matrices, for multi-line addressing.

Embodiments of the method may be implemented in processor control code embodied on a carrier medium or in a computer program product, or on a computer system comprising data memory for storing the various matrices, program memory storing the processor control code, and a processor to load and implement the code, or using dedicated hardware such as an ASIC (Application Specific Integrated Circuit) or FPGA (Field Programmable Gate Array).

Thus the invention further provides apparatus for digitally processing data in a data array defining a target matrix (X) using non-negative matrix factorisation to determine a pair of matrices (F, G), a first matrix of said pair determining a set of features for representing said data, a second matrix of said pair determining weights of said features, such that a product of said first and second matrices approximates said target matrix, the apparatus comprising: means for inputting said target matrix data (X); means for selecting a row of said one of said first and second matrices and a column of the other of said first and second matrices; means for determining a target contribution (R) of said selected row and column to said target matrix; means for determining subject to a non-negativity constraint, updated values for said selected row and column from said target contribution; and means for repeating said selecting and determining, for the other rows and columns of said first and second matrices until all said rows and columns have been updated.

In another aspect the invention provides a method of driving an electro-optic display, the display having a matrix of pixels, the method comprising: inputting image data for said matrix of pixels into an image data matrix; factorising said image data matrix into a product of first and second factor matrices; and driving said display using said factor matrices; and wherein said factorising comprising iteratively adjusting said factor matrices such that their product approaches said image data matrix; and wherein said iterative adjusting comprises adjusting each row of one of said factor matrices and each column of the other of said factor matrices in turn.

Broadly speaking the iterative adjusting comprises adjusting a first row and column pair, then another and another until all the rows of one of the factor matrices and all the columns of the other of the factor matrices have been updated. This provides fast convergence (unlike the standard NMF techniques) which can be implemented without the need for matrix inversion operations, as compared with conventional "whole matrix" approaches (for example ALS). Preferably the row/column adjusting is performed independently of a previous value for the row/column unlike conventional multiplicative (or additive) whole matrix update rule procedures which a new value is determined by multiplying an old value by a factor (or by adding/subtracting to an old value). Driving a display in this way reduces the peak brightness of a pixel as compared with row-by-row driving of the display with the same data.

The invention further provides a driver for an electro-optic display, the display having a matrix of pixels, the driver comprising: an input to input image data for said matrix of pixels into an image data matrix; a matrix factorisation system to factorise said image data matrix into a product of first and second factor matrices; and a driver output to drive said display using said factor matrices; and wherein said matrix factorisation system is configured to iteratively adjust said factor matrices, such that their product approaches said image data matrix, by adjusting each row of one of said factor matrices and each column of the other of said factor matrices in turn.

In another aspect the invention provides an integrated circuit to implement the above described matrix factorisation system.

In a further aspect the invention provides a method of processing a data array defining a target matrix (X) to determine a pair of factor matrices (F,G) such that a product of said factor matrices approximates said target matrix (X), the method comprising: determining for a single row or column of a first said factor matrix a value to which an updating rule would converge when iteratively applied, said updating rule comprising an updating rule of a factorising algorithm which iteratively updates two factor matrices to more closely approximate a target matrix using said updating rule; updating said row or column with said determined value; repeating said determining and updating for a column or row of a second said factor matrix; and repeating said determining and updating of said first and second factor matrices to update each row or column of said first factor matrix and each column or row of said second factor matrix.

In embodiments the updating rule may comprise, for example, a conventional iterator for Euclidean or divergence minimisation NMF as described in the prior art (for example "Algorithms for Non-negative Factorisation", D. D. Lee and H. S. Sung, Advances in Neural Information Processing Systems, Vol 13, 2001) or some other updating rule. Broadly speaking it will be appreciated that embodiments of this method provide "gain" by short circuiting the iteration procedure for a matrix element, thus providing faster convergence.

Processor control code to implement the above described methods may be provided on a data carrier such as a disk, CD or DVD-ROM, or programmed memory such as read-only memory (Firmware). The code may comprise code in a conventional programming language such as code for implementation by a digital signal processor (DSP) or code written in C, or microcode, or code for setting up or controlling an ASIC or FPGA, or code for a hardware description language such as Verilog (Trade Mark), VHDL or SystemC. As the skilled person will appreciate such code (and/or associated data) may be distributed between a plurality of coupled components in communication with one another.

These and other aspects of the invention will now be further described, by way of example only, with reference to the accompanying figures in which:

FIGS. 4a to 4e show row, column and image matrices for a conventional drive scheme and for a multiline addressing drive scheme respectively, corresponding brightness curves for a typical pixel over a frame period, and a diagrammatic representation of NMF factorisation of an image matrix;

Figure 11:
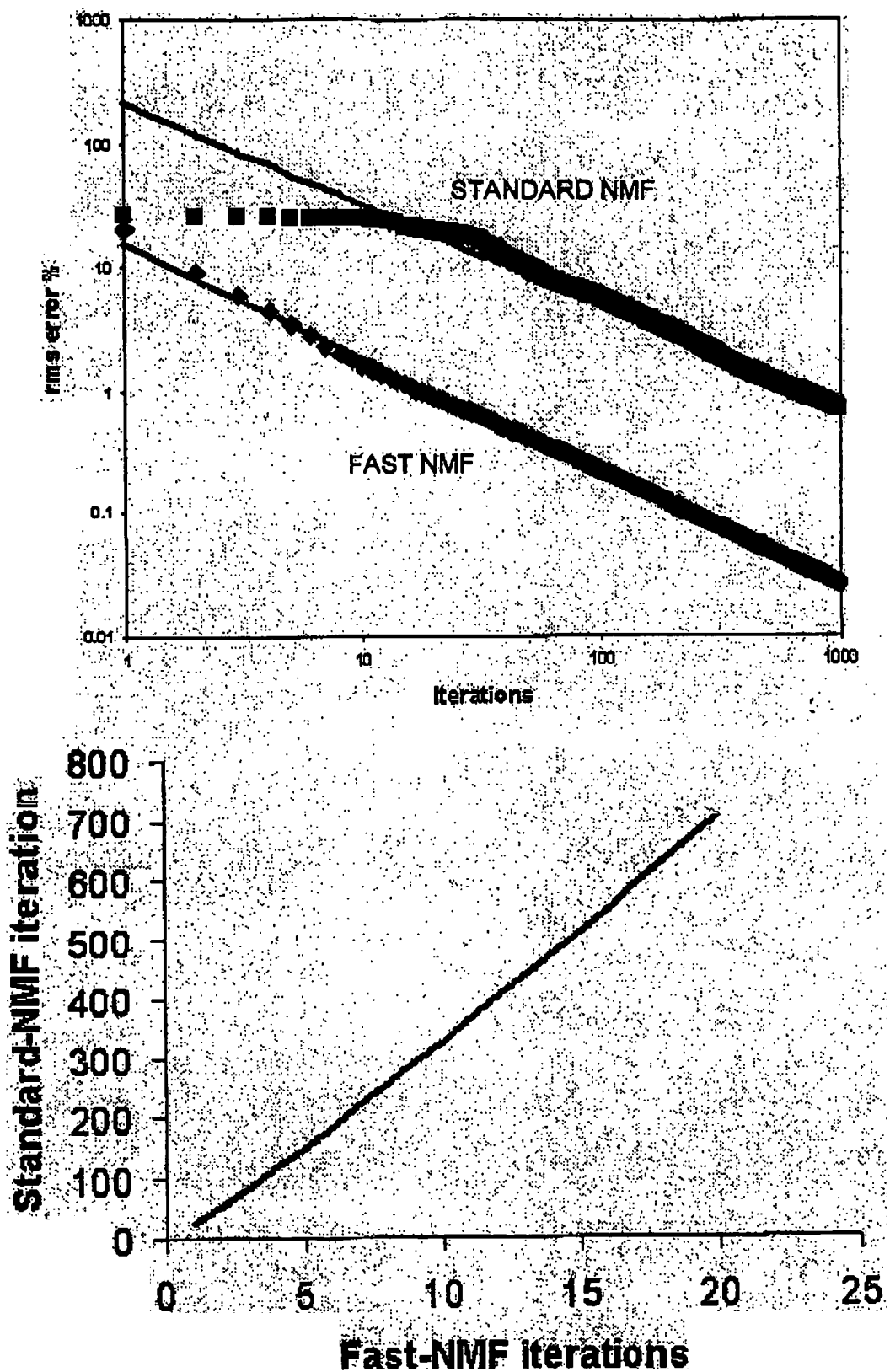

FIGS. 9a to 9f show, respectively, a starting image, iterations 1, 2 and 3, an output image after 10 iterations, and a second, compressed output image after 10 iterations, all processed for display in accordance with an embodiment of the invention;

FIGS. 10a to 10d show iterations 1, 2, 3 and 10 of an image processed in accordance with an embodiment of the invention using Euclidean (left hand images) and Divergence (right hand images) cost functions; and FIG. 11 shows the improvement in convergence rate for a procedure in accordance with an embodiment of the invention as compared with a conventional NMF procedure.

Figure 12:
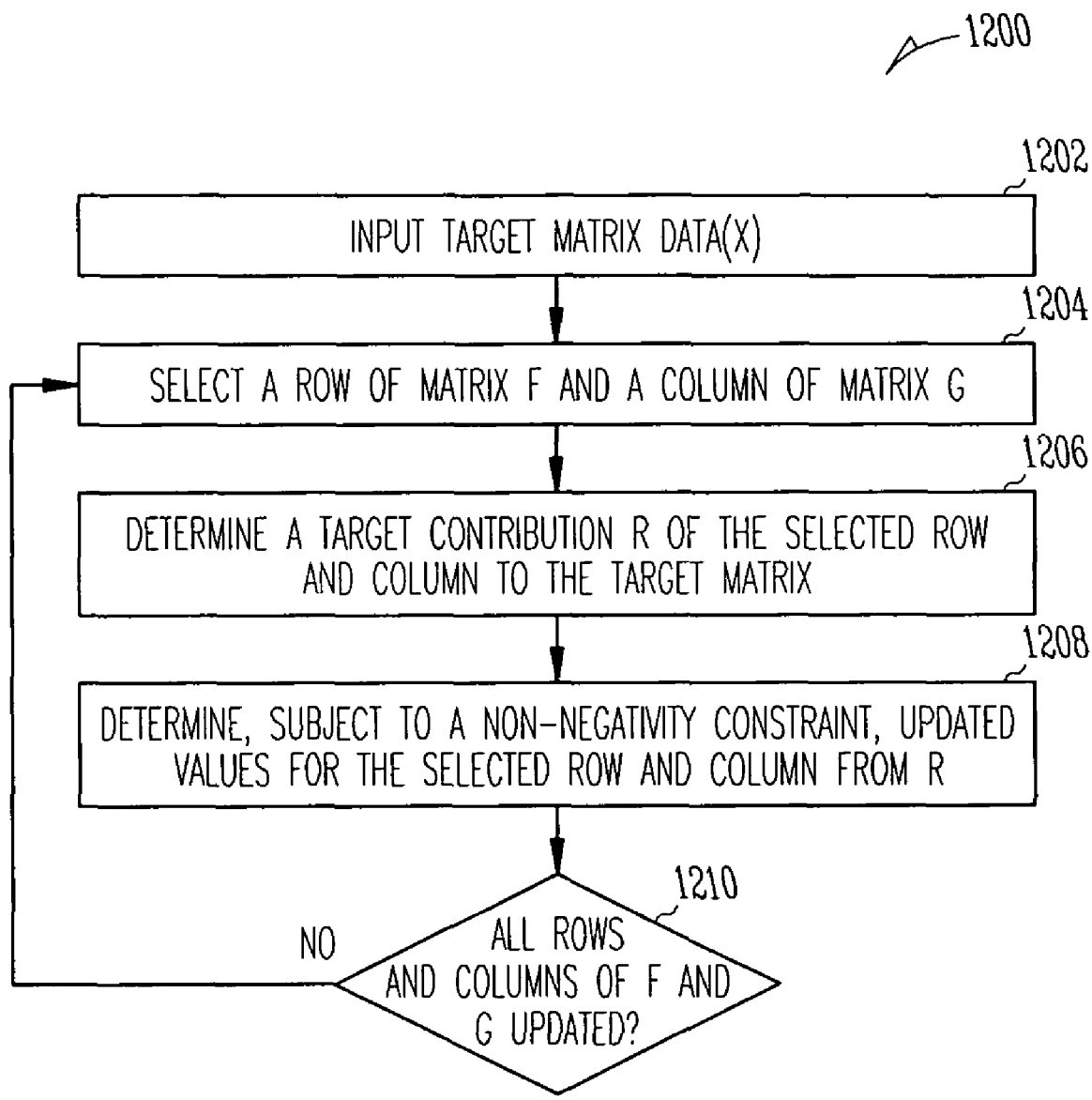

FIG. 12 shows a flowchart 1200 including: 1202 Input Target Matrix Data (X); 1204 Select a row of Matrix F and a column of Matrix G; 1206 Determine a target contribution R of the selected row and column to the Target Matrix; 1208 Determine, subject to a non-negativity constraint, updated values for the selected row and column from R; and 1210 All rows and columns of F and G updated?.

We will describe an embodiment of the invention with specific reference to driving organic light emitting diode (OLED) displays using multi-line addressing (MLA) techniques, although as we have already indicated applications of the invention are not limited to this.

Organic Light Emitting Diode Displays

Organic light emitting diodes, which here include organometallic LEDs, may be fabricated using materials including polymers, small molecules and dendrimers, in a range of colours which depend upon the materials employed. Examples of polymer-based organic LEDs are described in WO 90/13148, WO 95/06400 and WO 99/48160; examples of dendrimer-based materials are described in WO 99/21935 and WO 02/067343; and examples of so called small molecule based devices are described in U.S. Pat. No. 4,539,507. A typical OLED device comprises two layers of organic material, one of which is a layer of light emitting material such as a light emitting polymer (LEP), oligomer or a light emitting low molecular weight material, and the other of which is a layer of a hole transporting material such as a polythiophene derivative or a polyaniline derivative.

Organic LEDs may be deposited on a substrate in a matrix of pixels to form a single or multi-colour pixellated display. A multicoloured display may be constructed using groups of red, green, and blue emitting sub-pixels. So-called active matrix displays have a memory element, typically a storage capacitor and a transistor, associated with each pixel whilst passive matrix displays have no such memory element and instead are repetitively scanned to give the impression of a steady image. Other passive displays include segmented displays in which a plurality of segments share a common electrode and a segment may be lit up by applying a voltage to its other electrode. A simple segmented display need not be scanned but in a display comprising a plurality of segmented regions the electrodes may be multiplexed (to reduce their number) and then scanned.

Figure 1A:
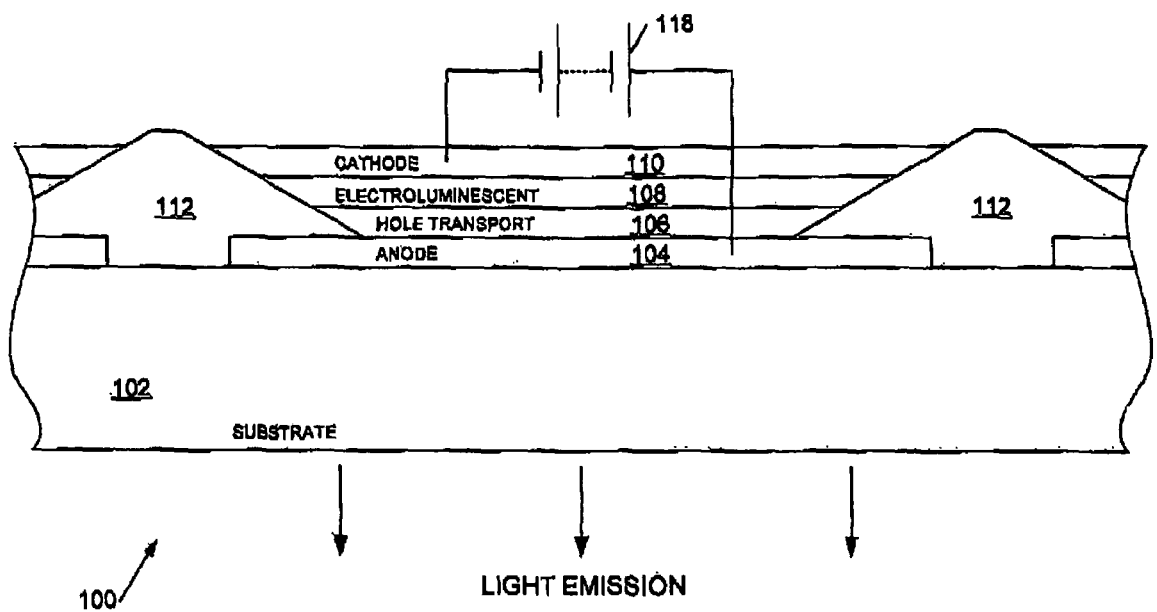
FIGS. 1a and 1b show, respectively, a vertical cross section through an OLED device, and a simplified cross section through a passive matrix OLED display.

FIG. 1a shows a vertical cross section through an example of an OLED device 100. In an active matrix display part of the area of a pixel is occupied by associated drive circuitry (not shown in FIG. 1a). The structure of the device is somewhat simplified for the purposes of illustration.

The OLED 100 comprises a substrate 102, typically 0.7 mm or 1.1 mm glass but optionally clear plastic or some other substantially transparent material. An anode layer 104 is deposited on the substrate, typically comprising around 150 nm thickness of ITO (indium tin oxide), over part of which is provided a metal contact layer. Typically the contact layer comprises around 500 nm of aluminium, or a layer of aluminium sandwiched between layers of chrome, and this is sometimes referred to as anode metal. Glass substrates coated with ITO and contact metal are available from Corning, USA. The contact metal over the ITO helps provide reduced resistance pathways where the anode connections do not need to be transparent, in particular for external contacts to the device. The contact metal is removed from the ITO where it is not wanted, in particular where it would otherwise obscure the display, by a standard process of photolithography followed by etching.

A substantially transparent hole transport layer 106 is deposited over the anode layer, followed by an electroluminescent layer 108, and a cathode 110. The electroluminescent layer 108 may comprise, for example, a PPV (poly(p-phenylenevinylene)) and the hole transport layer 106, which helps match the hole energy levels of the anode layer 104 and electroluminescent layer 108, may comprise a conductive transparent polymer, for example PEDOT:PSS (polystyrene-sulphonate-doped polyethylene-dioxythiophene) from Bayer AG of Germany. In a typical polymer-based device the hole transport layer 106 may comprise around 200 nm of PEDOT; a light emitting polymer layer 108 is typically around 70 nm in thickness. These organic layers may be deposited by spin coating (afterwards removing material from unwanted areas by plasma etching or laser ablation) or by inkjet printing. In this latter case banks 112 may be formed on the substrate, for example using photoresist, to define wells into which the organic layers may be deposited. Such wells define light emitting areas or pixels of the display.

Cathode layer 110 typically comprises a low work function metal such as calcium or barium (for example deposited by physical vapour deposition) covered with a thicker, capping layer of aluminium. Optionally an additional layer may be provided immediately adjacent the electroluminescent layer, such as a layer of barium fluoride, for improved electron energy level matching. Mutual electrical isolation of cathode lines may be achieved or enhanced through the use of cathode separators (not shown in FIG. 1a).

The same basic structure may also be employed for small molecule and dendrimer devices. Typically a number of displays are fabricated on a single substrate and at the end of the fabrication process the substrate is scribed, and the displays separated before an encapsulating can is attached to each to inhibit oxidation and moisture ingress.

To illuminate the OLED power is applied between the anode and cathode, represented in FIG. 1a by battery 118. In the example shown in FIG. 1a light is emitted through transparent anode 104 and substrate 102 and the cathode is generally reflective; such devices are referred to as "bottom emitters". Devices which emit through the cathode ("top emitters") may also be constructed, for example by keeping the thickness of cathode layer 110 less than around 50-100 nm so that the cathode is substantially transparent.

It will be appreciated that the foregoing description is merely illustrative of one type of OLED display, to assist in understanding some applications of embodiments of the invention. There is a variety of other types of OLED, including reverse devices where the cathode is on the bottom such as those produced by Novaled GmbH. Moreover application of embodiments of the invention are not limited to displays, OLED or otherwise.

Organic LEDs may be deposited on a substrate in a matrix of pixels to form a single or multi-colour pixellated display. A multicoloured display may be constructed using groups of red, green, and blue emitting pixels. In such displays the individual elements are generally addressed by activating row (or column) lines to select the pixels, and rows (or columns) of pixels are written to, to create a display. So-called active matrix displays have a memory element, typically a storage capacitor and a transistor, associated with each pixel whilst passive matrix displays have no such memory element and instead are repetitively scanned, somewhat similarly to a TV picture, to give the impression of a steady image.

Figure 1B:
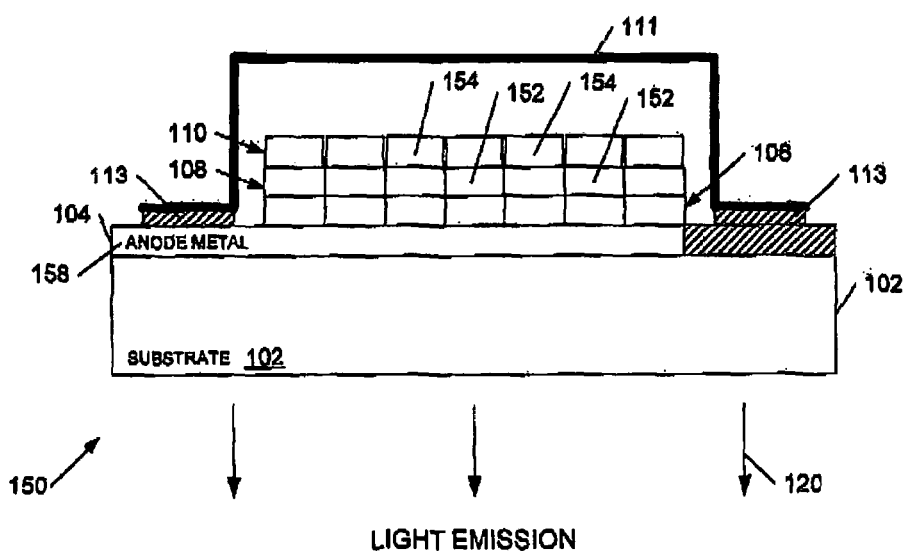

Referring now to FIG. 1b, this shows a simplified cross-section through a passive matrix OLED display device 150, in which like elements to those of FIG. 1a are indicated by like reference numerals. As shown the hole transport 106 and electroluminescent 108 layers are subdivided into a plurality of pixels 152 at the intersection of mutually perpendicular anode and cathode lines defined in the anode metal 104 and cathode layer 110 respectively. In the figure conductive lines 154 defined in the cathode layer 110 run into the page and a cross-section through one of a plurality of anode lines 158 running at right angles to the cathode lines is shown. An electroluminescent pixel 152 at the intersection of a cathode and anode line may be addressed by applying a voltage between the relevant lines. The anode metal layer 104 provides external contacts to the display 150 and may be used for both anode and cathode connections to the OLEDs (by running the cathode layer pattern over anode metal lead-outs). The above mentioned OLED materials, in particular the light emitting polymer and the cathode, are susceptible to oxidation and to moisture and the device is therefore encapsulated in a metal can 111, attached by UV-curable epoxy glue 113 onto anode metal layer 104, small glass beads within the glue preventing the metal can touching and shorting out the contacts.

Figure 2:
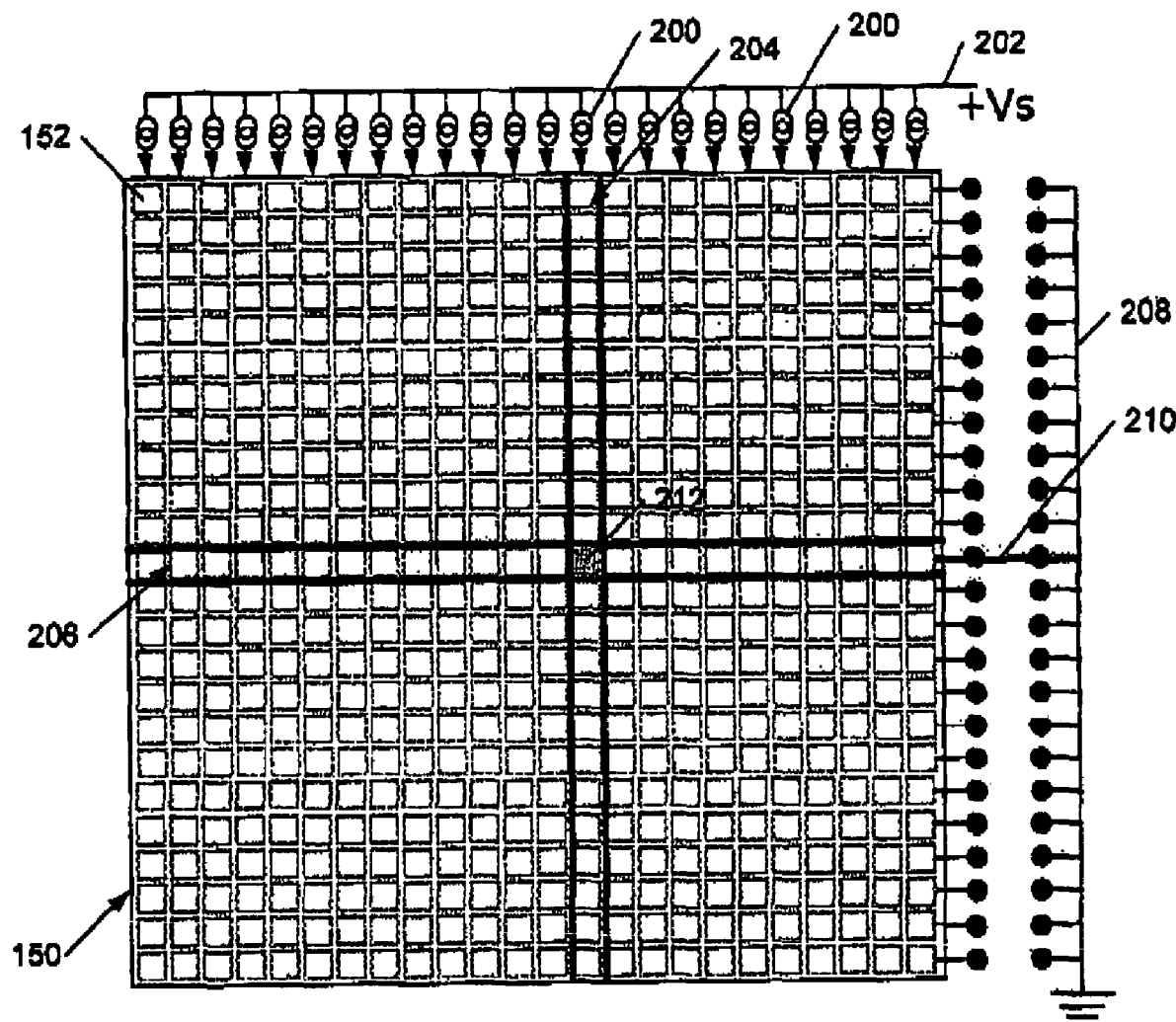
FIG. 2 shows conceptually a driving arrangement for a passive matrix OLED display.

Referring now to FIG. 2, this shows, conceptually, a driving arrangement for a passive matrix OLED display 150 of the type shown in FIG. 1b. A plurality of constant current generators 200 are provided, each connected to a supply line 202 and to one of a plurality of column lines 204, of which for clarity only one is shown. A plurality of row lines 206 (of which only one is shown) is also provided and each of these may be selectively connected to a ground line 208 by a switched connection 210. As shown, with a positive supply voltage on line 202, column lines 204 comprise anode connections 158 and row lines 206 comprise cathode connections 154, although the connections would be reversed if the power supply line 202 was negative and with respect to ground line 208.

As illustrated pixel 212 of the display has power applied to it and is therefore illuminated. To create an image connection 210 for a row is maintained as each of the column lines is activated in turn until the complete row has been addressed, and then the next row is selected and the process repeated. Preferably, however, to allow individual pixels to remain on for longer and hence reduce overall drive level, a row is selected and all the columns written in parallel, that is a current driven onto each of the column lines simultaneously to illuminate each pixel in a row at its desired brightness. Each pixel in a column could be addressed in turn before the next column is addressed but this is not preferred because, inter alia, of the effect of column capacitance.

The skilled person will appreciate that in a passive matrix OLED display it is arbitrary which electrodes are labelled row electrodes and which column electrodes, and in this specification "row" and "column are used interchangeably.

It is usual to provide a current-controlled rather than a voltage-controlled drive to an OLED because the brightness of an OLED is determined by the current flowing through the device, this determining the number of photons it generates. In a voltage-controlled configuration the brightness can vary across the area of a display and with time, temperature, and age, making it difficult to predict how bright a pixel will appear when driven by a given voltage. In a colour display the accuracy of colour representations may also be affected.

The conventional method of varying pixel brightness is to vary pixel on-time using Pulse Width Modulation (PWM). In a conventional PWM scheme a pixel is either full on or completely off but the apparent brightness of a pixel varies because of integration within the observer's eye. An alternative method is to vary the column drive current.

Figure 3:
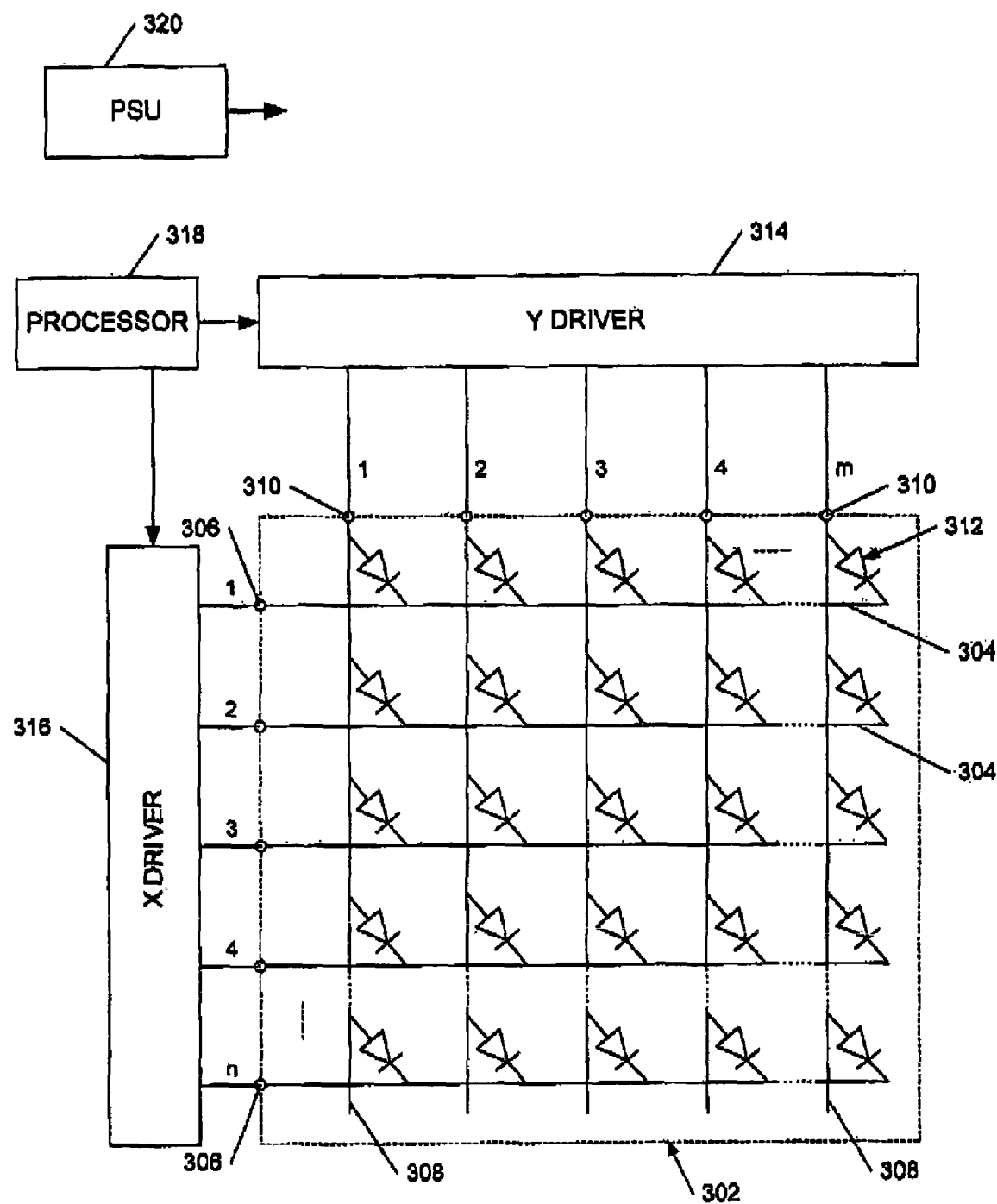
FIG. 3 shows a block diagram of a known passive matrix OLED display driver.

FIG. 3 shows a schematic diagram 300 of a generic driver circuit for a passive matrix OLED display according to the prior art. The OLED display is indicated by dashed line 302 and comprises a plurality n of row lines 304 each with a corresponding row electrode contact 306 and a plurality m of column lines 308 with a corresponding plurality of column electrode contacts 310. An OLED is connected between each pair of row and column lines with, in the illustrated arrangement, its anode connected to the column line. A y-driver 314 drives the column lines 308 with a constant current and an x-driver 316 drives the row lines 304, selectively connecting the row lines to ground. The y-driver 314 and x-driver 316 are typically both under the control of a processor 318. A power supply 320 provides power to the circuitry and, in particular, to y-driver 314.

Some examples of OLED display drivers are described in U.S. Pat. Nos. 6,014,119, 6,201,520, 6,332,661, EP 1,079, 361A and EP 1,091,339A and OLED display driver integrated circuits employing PWM are sold by Clare Micronix of Clare, Inc., Beverly, Mass., USA. Some examples of improved OLED display drivers are described in the Applicant's co-pending applications WO 03/079322 and WO 03/091983. In particular WO 03/079322, hereby incorporated by reference, describes a digitally controllable programmable current generator with improved compliance.

Multi Line Addressing (MLA) techniques

There is a continuing need for techniques which can improve the lifetime of an OLED display. There is a particular need for techniques which are applicable to passive matrix displays since these are very much cheaper to fabricate than active matrix displays. Reducing the drive level (and hence brightness) of an OLED can significantly enhance the lifetime of the device—for example halving the drive/brightness of the OLED can increase its lifetime by approximately a factor of four. We have previously described (see the Applicant's earlier patent applications, ibid) how multi-line addressing (MLA) techniques can be employed to reduce peak display drive levels, in particular in passive matrix OLED displays, and hence increase display lifetime.

Broadly speaking MLA techniques drive two or more row electrodes at the same time as the column electrodes are driven (or more generally drive groups of rows and columns simultaneously), so that the required luminescence profile of each row (line) is built up over a plurality of line scan periods rather than as an impulse in a single line scan period. Thus the pixel drive during each line scan period can be reduced, hence extending the lifetime of the display and/or reducing the power consumption due to a reduction of drive voltage and reduced capacitive losses. This is because OLED lifetime reduces with the pixel drive (luminance) to a power typically between 1 and 2 but the length of time for which a pixel must be driven to provide the same apparent brightness to an observer increases only substantially linearly with decreasing pixel drive. The degree of benefit provided by MLA depends in part upon the correlation between the groups of lines driven together.

FIG. 4a shows row G, column F and image X matrices for a conventional drive scheme in which one row is driven at a time. FIG. 4b shows row, column and image matrices for a multiline addressing scheme. FIGS. 4c and 4d illustrate, for a typical pixel of the displayed image, the brightness of the pixel, or equivalently the drive to the pixel, over a frame period, showing the reduction in peak pixel drive which is achieved through multiline addressing.

Generally the row and column drive signals are selected such that a desired luminescence of OLED pixels (or sub-pixels) driven by the corresponding electrodes is obtained by a substantially linear sum of luminescences determined by the drive signals. We have previously described (ibid) a controllable current divider to divide column current drive signals between two or more rows in accordance with the determined row drive signals.

To determine the required drive signals image data for display may be considered as a matrix and factorised into a product of two factor matrices, one defining row drive signals, the other column drive signals. The display is driven with successive sets of row and column signals, as defined by these matrices, to build up a displayed image, each set of signals defining a subframe of the displayed image the same size as the originally factorised matrix. The total number of line scan periods (subframes) may but need not necessarily be reduced compared with a conventional line-by-line scan (reduction implying image compression), since some benefit is obtained merely by averaging out the brightness over a number of subframes.

NMF Data Processing

Preferably the image matrix factorisation comprises non-negative matrix factorisation (NMF). Broadly speaking in NMF the image matrix X (which is non-negative) is factorised into a pair of matrices F and G such that X is approximately equal to the product of F and G, F and G being chosen subject to the constraint that their elements are all equal to or greater than zero. A typical NMF algorithm iteratively updates F and G to improve the approximation by aiming to minimise a cost function such as the squared Eucliden distance between X and FG. Non-negative matrix factorisation is useful for driving an electroluminescent display as such a display cannot be driven to produce a "negative" luminescence.

Figure 4E:
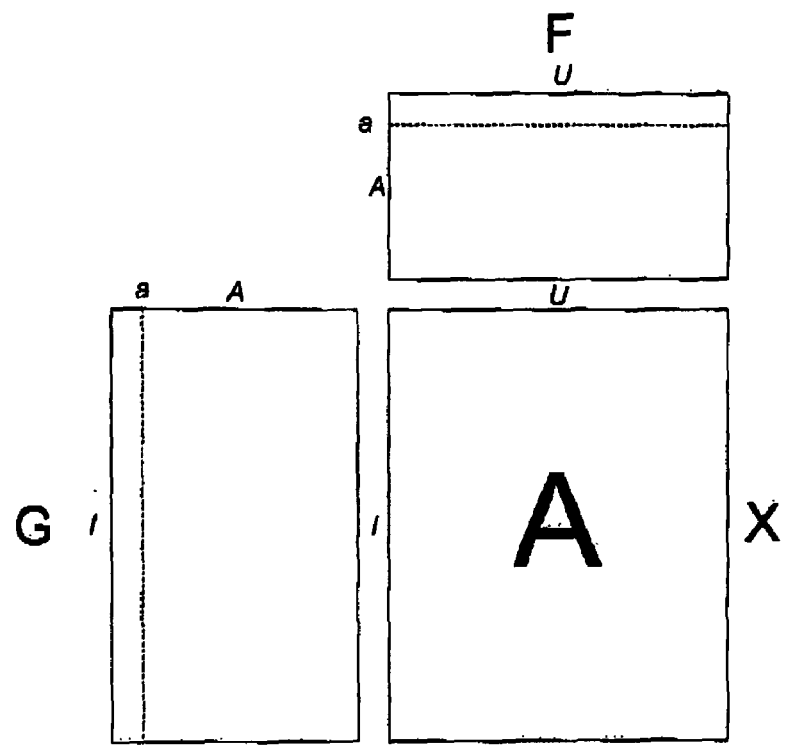

A NMF factorisation procedure is diagrammatically illustrated in FIG. 4e. The matrices F and G can be regarded as defining a basis for the linear approximation of the image data and in many cases a good representation of can be achieved with a relatively small number of basis vectors since images generally contain some inherent, correlated structure rather than purely random data. The colour sub-pixels of a colour display may be treated as three separate image planes or together as a single plane. Sorting the data in the factor matrices so that bright areas of a displayed image are generally illuminated in a single direction, from top to bottom of the display, can reduce flicker.

Background information relating to NMF techniques can be found in the following references: D. D. Lee, H. S. Seung. Algorithms for non-negative matrix factorization; P. Paatero, U. Tapper. Least squares formulation of robust non-negative factor analysis. Chemometr. Intell. Lab. 37 (1997), 23-35; P. Paatero. A weighted non-negative least squares algorithm for three-way 'PARAFAC' factor analysis. Chemometr. Intell. Lab. 38 (1997), 223-242; P. Paatero, P. K. Hopke, etc. Understanding and controlling rotations in factor analytic models. Chemometr. Intell. Lab. 60 (2002), 253-264; J. W. Demmel. Applied numerical linear algebra. Society for Industrial and Applied Mathematics, Philadelphia. 1997; S. Juntto, P. Paatero. Analysis of daily precipitation data by positive matrix factorization. Environmetrics, 5 (1994), 127-144; P. Paatero, U. Tapper. Positive matrix factorization: a non-negative factor model with optimal utilization of error estimates of data values. Environmetrics, 5 (1994), 111-126; C. L. Lawson, R. J. Hanson. Solving least squares problems. Prentice-Hall, Englewood Cliffs, N.J., 1974; Algorithms for Non-negative Matrix Factorization, Daniel D. Lee, H. Sebastian Seung, pages 556-562, Advances in Neural Information Processing Systems 13, Papers from Neural Information Processing Systems (NIPS) 2000, Denver, Colo., USA. MIT Press 2001; and Existing and New Algorithms for Non-negative Matrix Factorization By Wenguo Liu & Jianliang Yi (www.dcfl.gov/DCCI/rdwg/nmf.pdf; source code for the algorithms discussed therein can be found at http://www.c-s.utexas.edu/users/liuwg/383CProject/CS_383C_Project.htm).

Figure 5A:
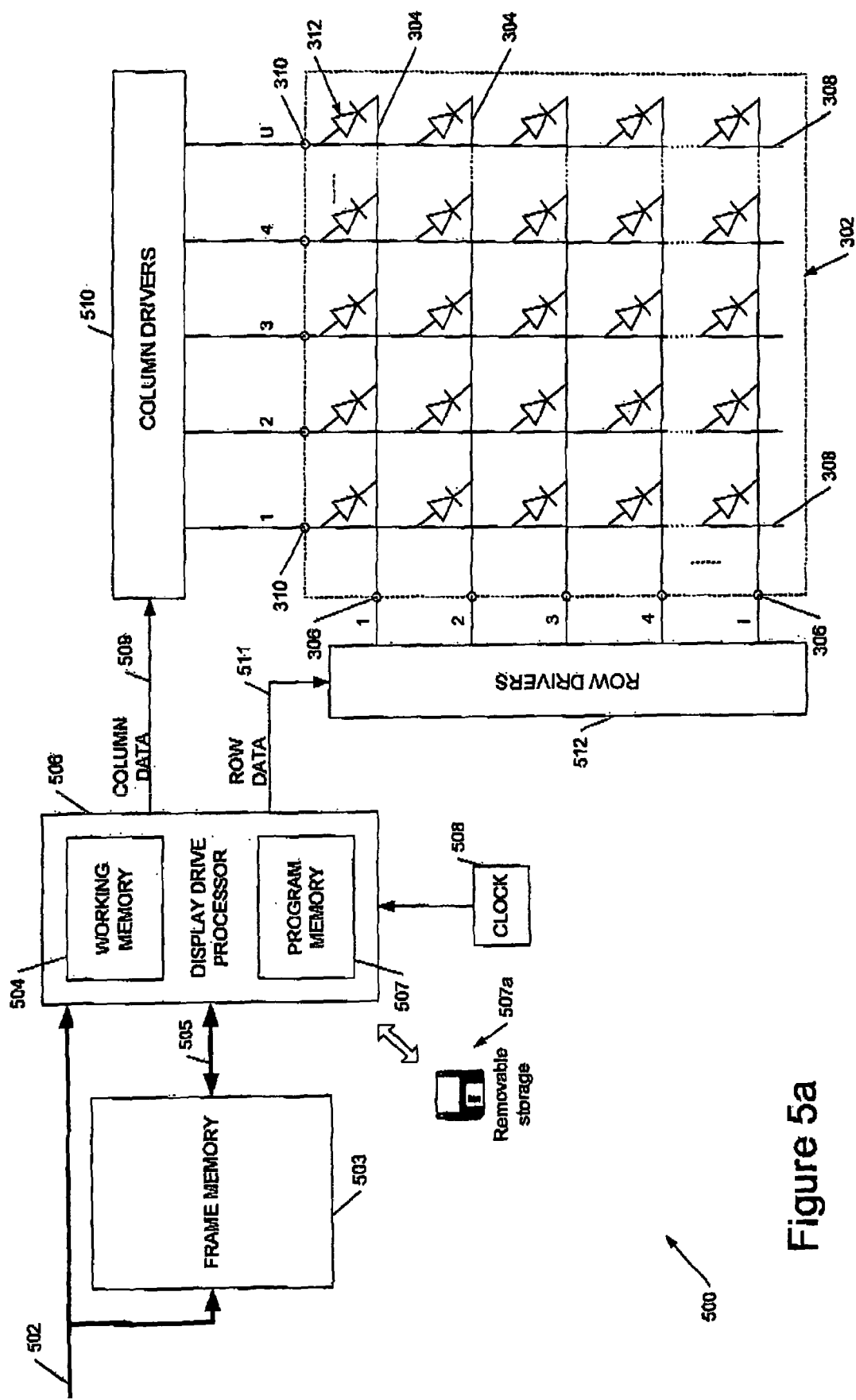
FIGS. 5a and 5b show a display driver embodying an aspect of the present invention, and example column and row drive arrangements for driving a display using the matrices of FIG. 4e.

FIG. 5a shows a schematic diagram of an embodiment of a passive matrix OLED driver 500 which implements an MLA addressing.

Figure 5B:
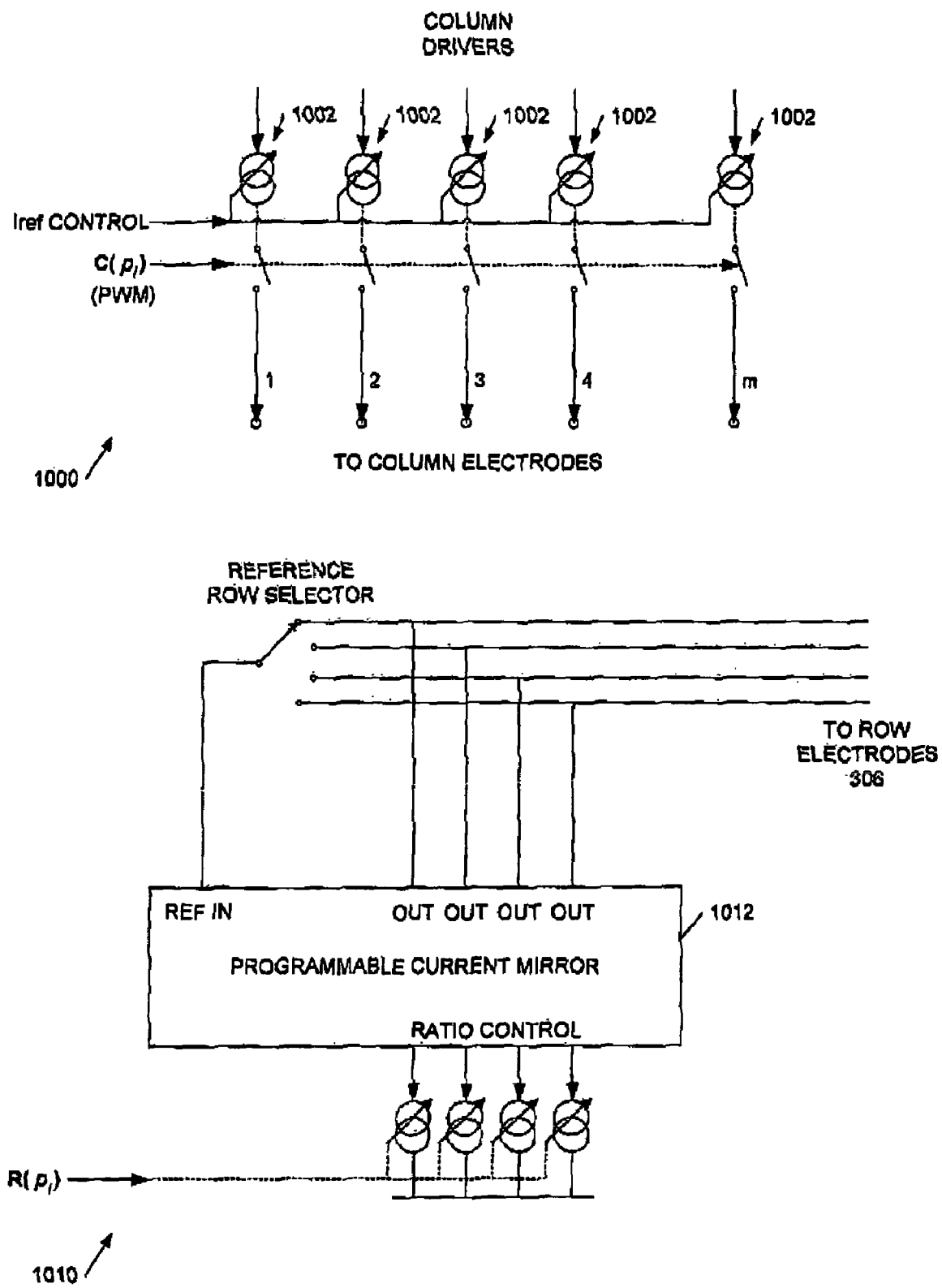

In FIG. 5a a passive matrix OLED display similar to that described with reference to FIG. 3 has row electrodes 306 driven by row driver circuits 512 and column electrodes 310 driven by column drives 510. Details of these row and column drivers are shown in FIG. 5b. Column drivers 510 have a column data input 509 for setting the current drive to one or more of the column electrodes; similarly row drivers 512 have a row data input 511 for setting the current drive ratio to two or more of the rows. Preferably inputs 509 and 511 are digital inputs for ease of interfacing; preferably column data input 509 sets the current drives for all the U columns of display 302.

Data for display is provided on a data and control bus 502, which may be either serial or parallel. Bus 502 provides an input to a frame store memory 503 which stores luminance data for each pixel of the display or, in a colour display, luminance information for each sub-pixel (which may be encoded as separate RGB colour signals or as luminance and chrominance signals or in some other way). The data stored in frame memory 503 determines a desired apparent brightness for each pixel (or sub-pixel) for the display, and this information may be read out by means of a second, read bus 505 by a display drive processor 506 (in embodiments bus 505 may be omitted and bus 502 used instead).

Display drive processor 506 may be implemented entirely in hardware, or in software using, say, a digital signal processing core, or in a combination of the two, for example, employing dedicated hardware to accelerate matrix operations. Generally, however, display drive processor 506 will be at least partially implemented by means of stored program code or micro code stored in a program memory 507, operating under control of a clock 508 and in conjunction with working memory 504. For example the display drive processor may be implemented using a standard digital signal processor and code written in a conventional programming language. The code in program memory 507 is configured to implement an embodiment of a multi-line addressing method as described further below, and may be provided on a data carrier or removable storage 507a.

FIG. 5b illustrates row and column drivers suitable for driving a display with a factorised image matrix. The column drivers 1000 comprise a set of adjustable substantially constant current sources 1002 which are ganged together and provided with a variable reference current $I_{ref}$ for setting the current into each of the column electrodes. This reference current is pulse width modulated by a different value for each column derived from a row of a factor matrix such as row a of matrix F of FIG. 4e. The row drive 1010 comprises a programmable current mirror 1012, preferably with one output for each row of the display or for each row of a block of simultaneously driven rows. The row drive signals are derived from a column of a factor matrix such as column a of matrix G of FIG. 4e. Further details of suitable drivers can be found in the Applicant's co-pending UK patent application no. 0421711.3 filed on 30 Sep. 2004, and in the PCT application GB2005/050168 filed 29 Sep. 2005 claiming priority therefrom, both hereby incorporated by reference. In other arrangements other means of varying the drive to an OLED pixel, in particular PWM, may additionally or alternatively employed.

Figure 6:
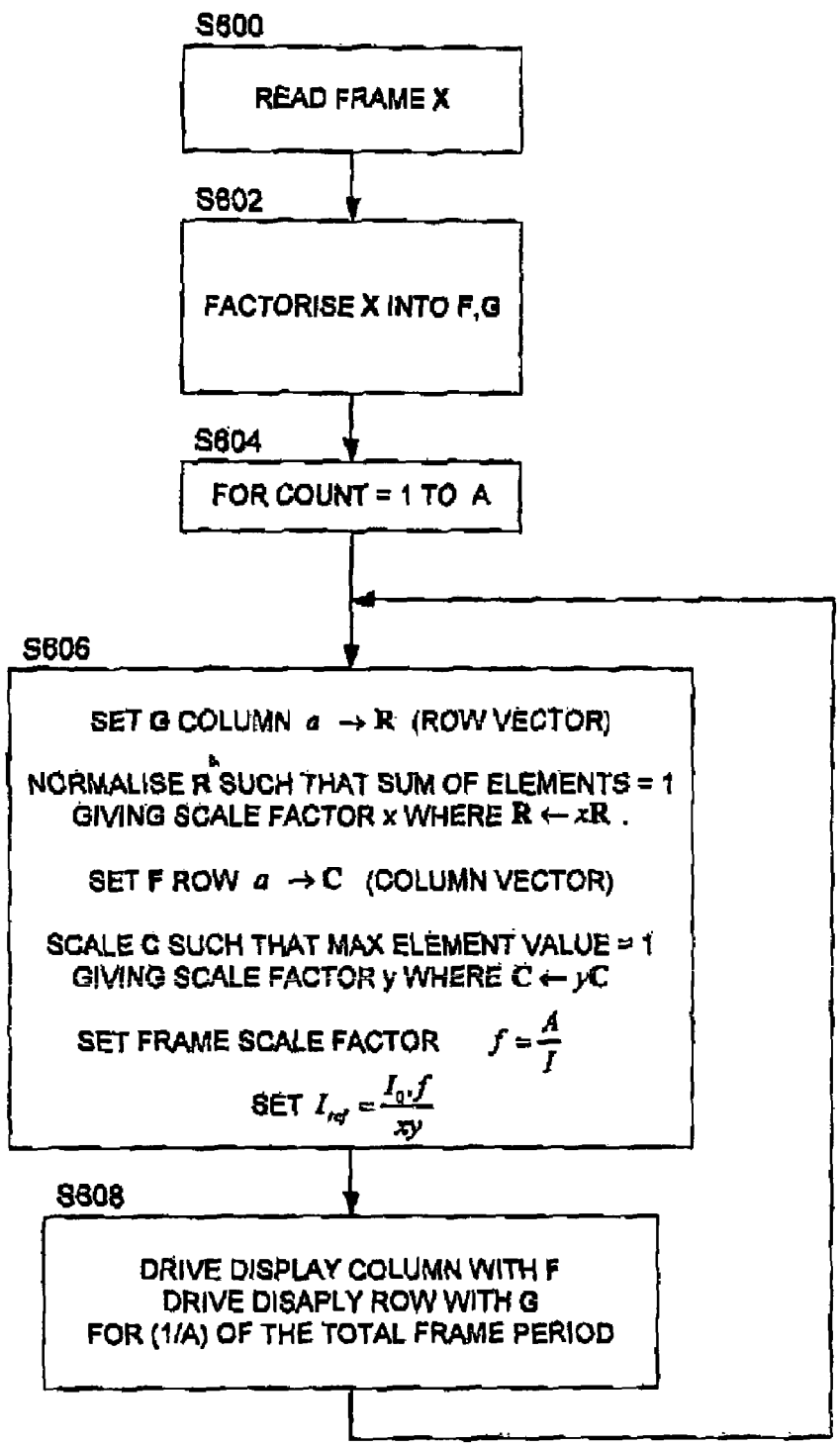
FIG. 6 shows a flow diagram for a method of driving a display using image matrix factorisation.

FIG. 6 shows a flow diagram of an example procedure for displaying an image using NMF, and which may be implemented in program code stored in program memory 507 of display drive processor 506 of FIG. 5a.

In FIG. 6 the procedure first reads the frame image matrix X (step S600), and then factorises this image matrix into factor matrices F and G using NMF (step S602). This factorisation may be computed during display of an earlier frame. The procedure then drives the display with A subframes at step 604. Step 606 shows the subframe drive procedure.

The subframe procedure sets G-column a→R to form a row vector R. This is automatically normalised to unity by the row driver arrangement of FIG. 5b and a scale factor x, R←xR is therefore derived by normalising R such that the sum of elements is unity. Similarly with F, row a→C to form a column vector C. This is scaled such that the maximum element value is 1, giving a scale factor y, C←yC. The a frame scale factor $$f = \frac{A}{I}$$

is determined and the reference current set by $$I_{ref} = \frac{I_0 \cdot f}{xy}$$

where $I_0$ corresponds to the current required for full brightness in a conventionally scanned line-at-a-time system, the x and y factors compensating for scaling effects introduced by the driving arrangement (with other driving arrangements one or both of these may be omitted).

Following this, at step S608, the display drivers shown in FIG. 5b drive the columns of the display with C and rows of the display with R for 1/A of the total frame period. This is repeated for each subframe and the subframe data for the next frame is then output.

Fast NMF Data Processing

Embodiments of NMF data processing procedures for MLA and other applications, according to the present invention, will now be described in more detail.

Figure 7:
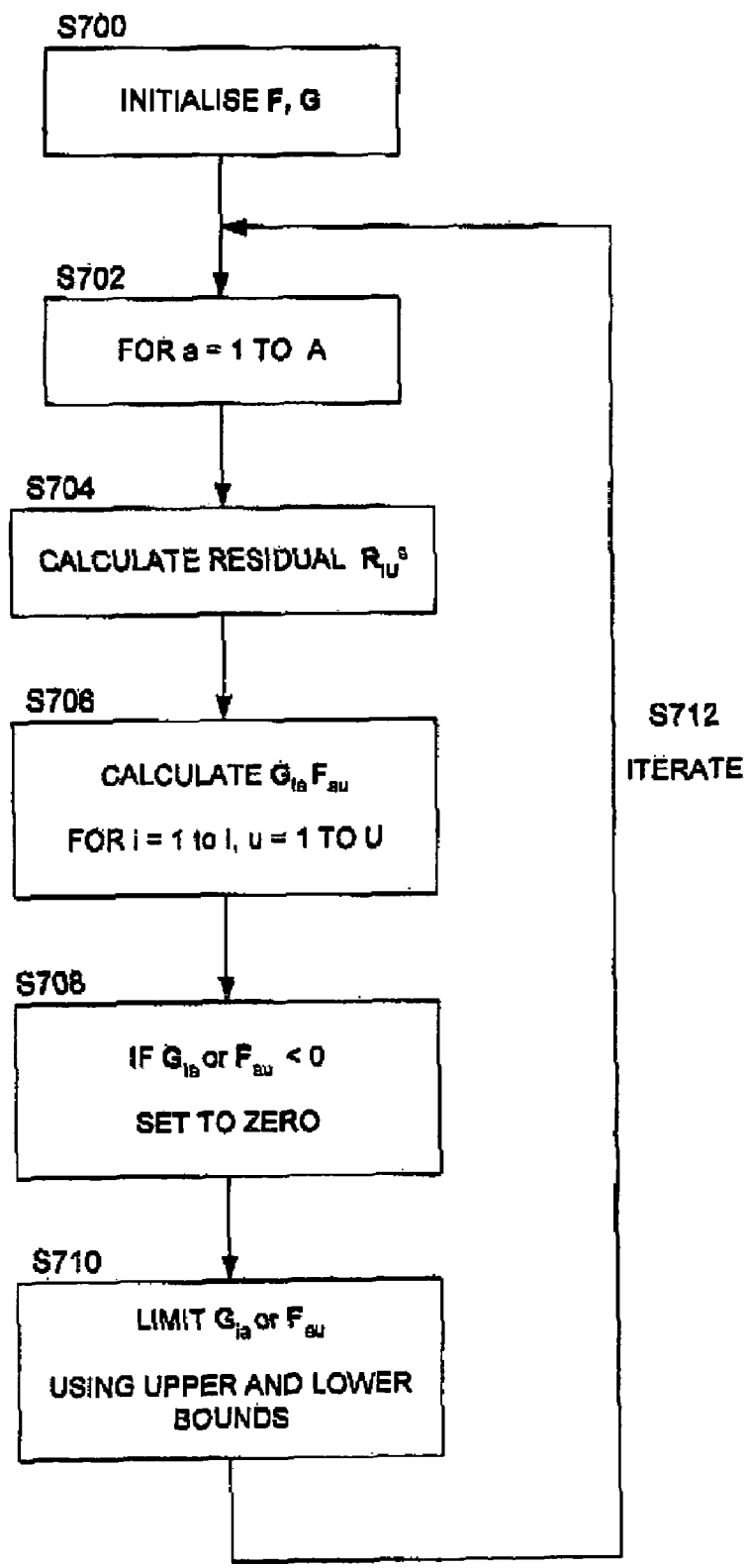
FIG. 7 shows a flow diagram of an NMF procedure embodying aspects of the present invention.

Referring to FIG. 4e and to FIG. 7, an NMF procedure embodying aspects of the present invention begins by initialising F and G (step S700) so that the product of G and F is equal to the average value of X, $X_{average}$, as follows:

$$G = 1_{IA} F = (X_{average}/A) \cdot 1_{AU} \tag{1}$$

For a sequence of related images previously found values of F and G may be used. The subscripts indicate number of rows and columns respectively; lower case subscripts indicate a single selected row or column (eg a for one of A rows); 1 is the unity matrix.

Preferably, as a pre-processing step (not shown) prior to step S700, blank rows and columns are filtered out.

The overall aim of the procedure is to determine values for F and G such that:

$$G_{IA} F_{AU} = X_{IU} \tag{2}$$

The procedure we describe operates with a single column (a) of G and a single row (a) of F at a time, stepping through all the column-row pairs, from a=1 to a=A (step S702). Thus the procedure, for each column of G and row of F, first calculates a residual $R_{IU}^a$ for the selected column-row pair, this residual comprising a difference between the target $X_{IU}$ and a sum of the combined contributions of all the other columns and rows of G and F except for the selected column/row (step S704):

$$R_{IU}^a = X_{IU} - \sum_{n=1}^{A, n \neq a} G_{In} F_{nU} \tag{3}$$

Figure 8:
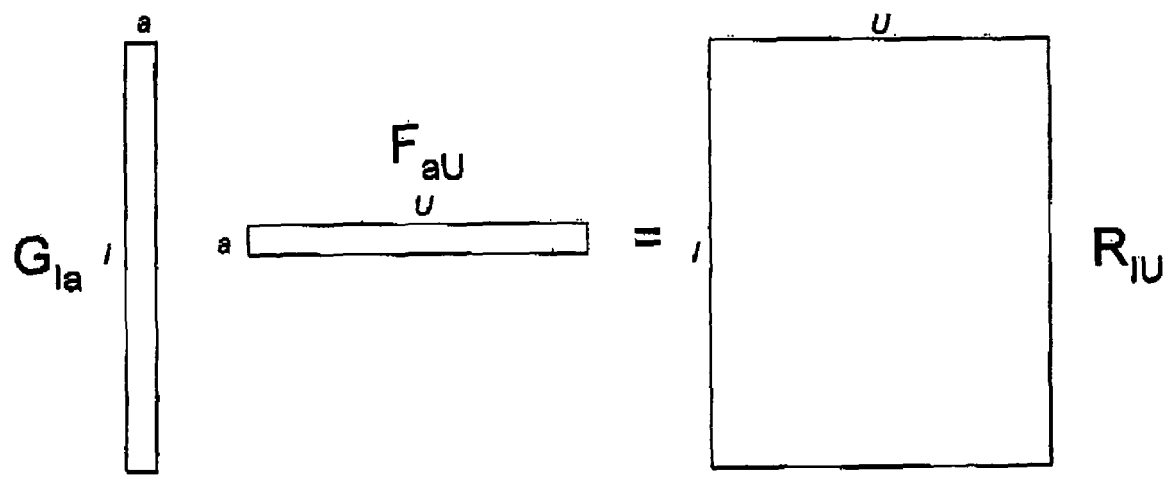
FIG. 8 shows, diagrammatically, multiplication of a selected column and row of the G and F matrices of FIG. 4e to determine a residual matrix.

For each selected column-row pair a of G and F the aim is for the contribution of the selected column-row pair to equal the residual $R_{IU}^a$, as illustrated diagrammatically in FIG. 8. In mathematical terms the aim is:

$$G_{Ia} F_{aU} = R_{IU}^a \tag{4}$$

where $R_{IU}^a$ defines an I×U image subframe with mux rate A (A subframes contributing to a complete I×U displayed image).

Equation (4) can be solved for each of the I elements $G_{ia}$ of the selected column a of G and for each of the U elements $F_{au}$ of the selected row a of F (step S706). The solution depends upon the cost function. For example, performing a least squares fit (a Euclidean cost function) on (4) multiplies the left hand side by $F_{aU} \cdot F_{aU}^T$ (which is a scalar value, so that no matrix inversion is required to divide both sides by this) and multiplies the right hand side by $F_{aU}^T$, allowing $G_{ia}$ to be calculated directly. This is described in more detail later.

Some example solutions are as follows.

For a Euclidean cost function, which aims to minimise the following expression, where A and B are non-negative matrices X and G·F:

$$\|A - B\|^2 = \sum_{i,j} (A_{ij} - B_{ij})^2 \tag{5}$$

$$G_{ia} = \frac{\sum_{u=1}^{U} R_{iu}F_{au}}{\sum_{u=1}^{U} F_{au}^2}, F_{au} = \frac{\sum_{i=1}^{I} G_{ia}R_{iu}}{\sum_{i=1}^{I} G_{ia}^2}$$

For a "divergence" cost function (Lee and Seung, ibid) which aims to minimise the following (the log is to base e):

$$D(A\|B) = \sum_{i,j}\left(A_{ij}\log\frac{A_{ij}}{B_{ij}} - A_{ij} + B_{ij}\right) \quad (6)$$

$$G_{ia} = \frac{\sum_{u=1}^{U}\frac{R_{iu}F_{au}}{\Theta_{iu}}}{\sum_{u=1}^{U}\frac{F_{au}^2 X_{iu}}{\Theta_{iu}^2}}, F_{au} = \frac{\sum_{i=1}^{I}\frac{G_{ia}R_{iu}}{\Theta_{iu}}}{\sum_{i=1}^{I}\frac{G_{ia}^2 X_{iu}}{\Theta_{iu}^2}}$$

where $\Theta_{iu} = X_{iu} \cdot R_{iu}$. For a generalised method:

$$G_{ia} = \frac{\sum_{u=1}^{U} R_{iu}F_{au}\Phi_{iu}}{\sum_{u=1}^{U} F_{au}^2\Phi_{iu}}, F_{au} = \frac{\sum_{i=1}^{I} G_{ia}R_{iu}\Phi_{iu}}{\sum_{i=1}^{I} G_{ia}^2\Phi_{iu}} \quad (7)$$

where $\Phi_{iu}$ is a parameter (of the I×U matrix $\Phi$), which may be a constant or which may depend upon one or more of $\Theta_{iu}$, $X_{iu}$ and $R_{iu}$, and which controls speed of convergence (further details are given later).

To provide a non-negativity constraint, values of $G_{ia}$ and $F_{au}$ which are less than zero are set to zero (or a small value), at step S708 (elements of $R_{IU}{}^a$ are permitted to be negative).

Preferably (but not essentially), to prevent division by zero (or infinite) values of $G_{ia}$ and $F_{au}$ may be limited by upper and/or lower bounds of, for example, 0.01 or 0.001 and 10 or 100; these may be varied according to the application (step S710).

Optionally but preferably the procedure then iterates (step S712), for example for a predetermined number of iterations.

As described in more detail later, because the human eye is more sensitive to small brightness differences at low brightness levels than at high brightness levels a Euclidean cost function is not necessarily optimal, and RMS (root mean square) error in the final image is not necessarily the best figure of merit (although convenient).

It will be appreciated that the above procedure does not employ a conventional multiplicative update rule, where F and G are each multiplied by a factor to bring them closer to a stationary point of a cost function. Instead new values are jointly determined for single column/row pairs of F and G selected in turn, the new values of the elements $G_{ia}$ and $F_{au}$ being calculated without reference to their previous values—in equations (5)-(7) above the calculation is a new value for, say $G_{ia}$ depends upon F and $R^a$ but it can be seen from equation (3) that $R^a$ is not dependent upon column $G_{Ia}$.

The inventor has recognised that there is a general method for deriving a fast-converging pairwise-update NMF procedure from any conventional whole matrix procedure. Broadly speaking the whole matrix procedure is applied to determine what values the procedure would converge to for a single column/row, and this calculation is then used to determine an algebraic expression for these convergence values. This algebraic expression is then used for a pairwise column and row update of the factor matrices, selected pair by selected pair. This will be illustrated for the examples of Euclidean and Divergence cost functions but can also be applied to other whole matrix NMF procedures to generate new fast-converging procedures. We then describe an alternative derivation and a generalisation of these illustrative examples.

Using a standard iterator for Euclidean minimisation NMF (only one iterator shown; the results applicable to the other iterator by symmetry), expressed for an iteration performed on one subframe only, a lowercase index indicating a single element (row or column) and an uppercase index indicating the operation on the whole range:

$$G'_{Ia} = G_{Ia}\frac{X_{IU}F_{aU}^T}{G_{IA}F_{AU}F_{aU}^T} \quad (8)$$

Substituting in the following:

$$B_I = X_{IU}F_{aU}^T \quad (9)$$

and $$C_A = F_{AU}F_{aU}^T \quad (10)$$

into (8) gives:

$$G'_{Ia} = G_{Ia}\frac{B_I}{G_{IA}C_A} \quad (11)$$

Which can be expanded to give:

$$G'_{ia} = G_{ia}\frac{B_i}{G_{ia}C_a + \sum_{n=1}^{A,n\neq a} G_{in}C_n} \quad (12)$$

Consider the case where this expression is not applied once per iteration, but multiple times until $G_{ia}$ reaches equilibrium. Equilibrium can be reached in one of two ways: a) $G_{ia}$ tends to zero or b) the ratio tends to unity. For the ratio to equal unity:

$$G_{ia} = \frac{B_i - \sum_{n=1}^{A,n\neq a} G_{in}C_n}{C_a} \quad (13)$$

It can be seen that the expression (12) can never result in a negative G element when all terms in G, F and X are positive, however expression (13) can return a negative value, and it is the case where (13) returns a negative when repeated application of (12) would result in $G_{ia}$ tending to zero. Therefore in this case $G_{ia}$ is set to zero, or to some minimal value. It should also be noted that if Ca is very small, or zero, then a distortingly large value may result—in this case a reasonable maximum limit to $G_{ia}$ may be applied.

Equation (13), with a similar iterator for F, can be used as an alternative Euclidean minimisation iterator, stepping through the two matrices one a index at a time.

FIG. 9 shows (in a format corresponding to FIG. 4e) the result of 10 iterations of the above procedure. FIGS. 9a to 9e show, respectively, the starting image, iterations 1, 2 and 3 and the output image after 10 iterations.

The image is monochrome, 126 pixels wide by 100 pixels high and the procedure was initialised with uniform F and G (FIG. 9*b*); a centroid sorting was applied to columns of G and to the rows of F for the final image; 100 subframes were used (A=100). The results are characterised as follows:

| | |
|---|---|
| Image row count (original MUX) | 100 |
| Raw MLA MUX | 100 |
| Effective MLA MUX | 32.418824 |
| Estimated life expectancy gain* | 3.084628 |

*note:
assumes a quadratic dependency of life expectancy on drive level

Figure 9A:
Figure 9B:
Figure 9C:
Figure 9D:
Figure 9E:
Figure 9F:
Figure 10A:
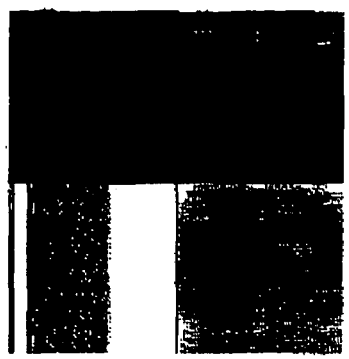
Figure 10A:
Figure 10B:
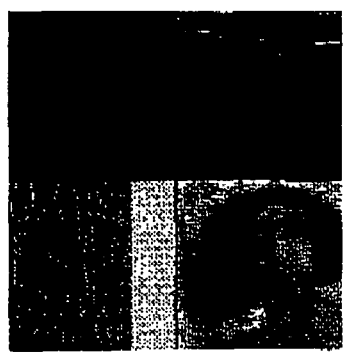
Figure 10B:
Figure 10C:
Figure 10C:
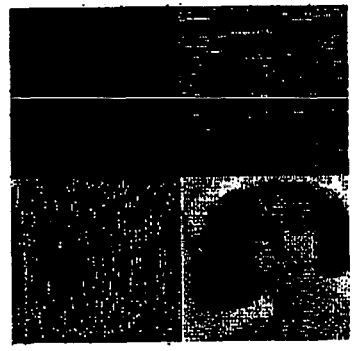
Figure 10D:
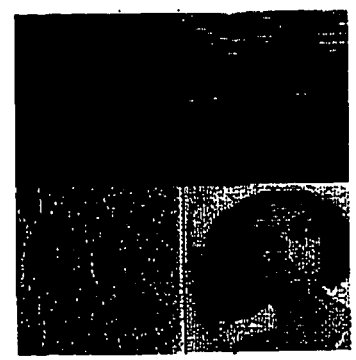
Figure 10D:
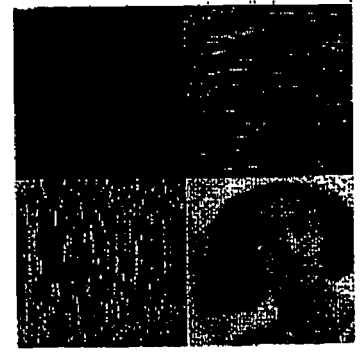

A second run with half the rows (A=50) gave the result shown in FIG. 9*f*. The iterator was adapted with a minimum result of 0.001 and a maximum of 10, with each column of the row matrix being re-normalised to a maximum of 1 after each iteration of a complete frame. The results of this run are characterised as follows:

| | |
|---|---|
| Image row count (original MUX) | 100 |
| Raw MLA MUX | 50 |
| Effective MLA MUX | 19.879786 |
| Estimated life expectancy gain* | 5.030235 |

*note:
assumes a quadratic dependency of life expectancy on drive level

Using a standard iterator for Divergence minimisation NMF (only one iterator shown; the results applicable to the other iterator by symmetry), expressed for an iteration performed on one subframe only, a lowercase index indicating a single element (row or column) and an uppercase index indicating the operation on the whole range:

$$G'_{ia} = G_{ia} \frac{\sum_u [F_{au} X_{iu} / (GF)_{iu}]}{\sum_u F_{au}} \quad (14)$$

Expanding and separating out the $G_{ia}$ term within the ratio:

$$G'_{ia} = G_{ia} \frac{\sum_u \left[ \frac{F_{au} X_{iu}}{\sum_{n=1}^{A,n\neq a} G_{in} F_{nu} + G_{ia} F_{au}} \right]}{\sum_u F_{au}} \quad (15)$$

Re-Arranging:

$$G'_{ia} = G_{ia} \frac{\sum_u \left[ \frac{F_{au} X_{iu}}{\sum_{n=1}^{A,n\neq a} G_{in} F_{nu} \left(1 + \frac{G_{ia} F_{au}}{\sum_{n=1}^{A,n\neq a} G_{in} F_{nu}}\right)} \right]}{\sum_u F_{au}} \quad (16)$$

And substituting in:

$$C_u = \frac{F_{au}}{\sum_{n=1}^{A,n\neq a} G_{in} F_{nu}} \quad (17)$$

into (16) gives:

$$G'_{ia} = G_{ia} \frac{\sum_u \left[ \frac{C_u X_{iu}}{1 + G_{ia} C_u} \right]}{\sum_u F_{au}} \quad (18)$$

If we can assume $G_{ia} C_u \ll 1$ then (by a Taylor series expansion):

$$\frac{1}{1 + G_{ia} C_u} \approx (1 - G_{ia} C_u) \quad (19)$$

Substituting (19) into (18) gives:

$$G'_{ia} = G_{ia} \frac{\sum_u C_u X_{iu} (1 - G_{ia} C_u)}{\sum_u F_{au}} \quad (20)$$

Which expands to:

$$G'_{ia} = G_{ia} \frac{\sum_u C_u X_{iu} - G_{ia} \sum_u C_u^2 X_{iu}}{\sum_u F_{au}} \quad (21)$$

Taking the principal of repeated application of the above iterator, as described above with reference to the Euclidean minimisation iterator, the same conclusion can be drawn, that is the value of $G_{ia}$ will reach a stable value either as it approaches zero or as the ratio approaches 1.

For the ratio to approach unity:

$$G_{ia} = \frac{\sum_u C_u X_{iu} - \sum_u F_{au}}{\sum_u C_u^2 X_{iu}} \quad (22)$$

And for the case where $$\sum_u C_u X_{iu} \leq \sum_u F_{au}$$

then $G_{ia}$ will tend to zero.

In practice it is preferred to limit all values of G (and, by summetry, F) to within two limits, for example $0.001 \leq G$, $F \leq 1000$ seems to provide a good solution.

FIGS. 10*a* to 10*d* show iterations 1, 2, 3 and 10 of a 100×100 pixel monochrome image processed in accordance with the above described techniques using Euclidean (left hand images) and Divergence (right hand images) cost functions. The results after 20 iterations for full subframe solution are:

|  | Fast Euclidean NMF | Fast Divergence NMF |
| --- | --- | --- |
| Worst case MUX | 28.8 | 14.7 |
| Average MUX | 14 | 8 |
| Average MLA level | 13.5 lines | 19.4 lines |
| Average lifetime gain | ×5.4 | ×10 |

The general conclusions are that fast divergence NMF produces a more recognisable image faster than fast Euclidean NMF, but with a larger RMS luminance error; and that fast divergence NMF produces (much) more distributed solutions—i.e. the average effective MUX rate is lower, sometimes by a factor of 2.

We next describe a generalised fast NMF technique that can be applied in embodiments of the present invention.

The target is to determine values for G and F such that:

$$G_{IA}F_{AU} = X_{IU} \tag{23}$$

Expressing this as a sum of terms:

$$\sum_{a=1}^{A} G_{Ia}F_{aU} = X_{IU} \tag{24}$$

where, as before, a lower case index denotes a single element, an upper case index the complete range so that, for example $G_{Ia}$ represents a single sub-frame row signal vector. We are interested in obtaining the best fit for a single sub-frame:

$$G_{Ia}F_{aU} = X_{IU} - \sum_{n=1}^{A, n \neq a} G_{In}F_{nU} = R_{IU}^{a} \tag{25}$$

This can now be solved, for either G or F, using a least-squares fit procedure. The derivation of such a least squares fit is as follows:

$$Aa = b$$

$$A^T A a = A^T b$$

$$a = (A^T A)^{-1} A^T b \tag{26}$$

where a is a vector containing the n unknown constants, A is an m×n matrix of the known parameters and b is a vector containing the m known results (compare, for example, to the more familiar notation y=Xa where each value of y is associated with values of $x_1, x_2 \ldots$, solving for a). If n>m (i.e. if there are more unknowns than results) then $A^T A$ is singular and non-invertable.

Here the procedure of (26) is applied directly to (25), multiplying by $F_{aU}^T$ to solve for a single value of G (ie. $G_{ia}$):

$$G_{ia}F_{aU}F_{aU}^T = X_{iU}F_{aU}^T - \sum_{n=1}^{A, n \neq a} G_{in}F_{nU}F_{aU}^T \tag{27}$$

$$G_{ia} = \frac{X_{iU}F_{aU}^T - \sum_{n=1}^{A, n \neq a} G_{in}F_{nU}F_{aU}^T}{F_{aU}F_{aU}^T}$$

$$G_{ia} = \frac{\sum_{u=1}^{U} \left( X_{iu}F_{au} - \sum_{n=1}^{A, n \neq a} G_{in}F_{nu}F_{au} \right)}{\sum_{u=1}^{U} F_{au}^2}$$

Which is possible as $F_{aU}$ is a vector, therefore $F_{aU}F_{aU}^T$ is a single, scalar value and so no matrix inversion is required. This is precisely the fast iterator derived from the original Euclidean minimisation NMF. Applying (26) to (25) to solve for F produces a similar result.

The result can, if desired, be expressed more simply by introducing $R_{IU}$ which is the residual luminance unsolved by the other sub-frames, that is:

$$R_{IU} = X_{IU} - \sum_{n=1}^{A, n \neq a} G_{In}F_{nU} \tag{28}$$

So (27), and the iterator for F, becomes:

$$G_{ia} = \frac{\sum_{u=1}^{U} R_{iu}F_{au}}{\sum_{u=1}^{U} F_{au}^2}, \quad F_{au} = \frac{\sum_{i=1}^{I} G_{ia}R_{iu}}{\sum_{i=1}^{I} G_{ia}^2} \tag{29}$$

Re-expressing the fast divergence iterator in a similar way:

$$G_{ia} = \frac{\sum_{u=1}^{U} \frac{R_{iu}F_{au}}{\Theta_{iu}}}{\sum_{u=1}^{U} \frac{F_{au}^2 X_{iu}}{\Theta_{iu}^2}}, \quad F_{au} = \frac{\sum_{i=1}^{I} \frac{G_{ia}R_{iu}}{\Theta_{iu}}}{\sum_{i=1}^{I} \frac{G_{ia}^2 X_{iu}}{\Theta_{iu}^2}} \tag{30}$$

where $$\Theta_{iu} = \sum_{n=1}^{A, n \neq a} G_{in}F_{nu} = X_{iu} - R_{iu} \tag{31}$$

This re-expression suggests other options, and how to resolve some of the short-comings of the above techniques, in particular that the Euclidean minimisation, as it is concerned with minimising absolute differences, tends to produce noise in the black levels and that the divergence minimisation can get easily stuck.

Examination of (29) and (30) leads to a number of observations. First the divergence minimisation weights the sums by a factor approximately inversely proportional to the pixel luminance at that location. This seems to more successfully preserve black levels correctly, however the sums in the ratio are not balanced, that is the terms in the nominator and denominator are not the same. This may explain why the method can get quite quickly to a partial solution, but then sometimes does not then progress to a good final solution. This suggests that a good iterator needs to be balanced, however weighting to improve black levels would be advantageous.

Broadly speaking the methods we describe have the general form:

$$G_{ia} = \frac{\sum_{u=1}^{U} R_{iu} F_{au} \Phi_{iu}}{\sum_{u=1}^{U} F_{au}^2 \Phi_{iu}}, F_{au} = \frac{\sum_{i=1}^{I} G_{ia} R_{iu} \Phi_{iu}}{\sum_{i=1}^{I} G_{ia}^2 \Phi_{iu}} \quad (32)$$

For example if $\Phi_{iu}=1$ then (32) becomes the fast Euclidean iterator. Other preferred possibilities include $\Phi_{iu}1(\Theta_{iu}+\gamma)$, $\Phi_{iu}=1/(X_{iu}+\gamma)$ and $\Phi_{iu}=1/(R_{iu}+\gamma)$ where $\gamma$ is a small value to prevent divisions by zero (e.g. y=0.001). All of these converge quickly producing RMS luminance errors close to (29) but with much lower divergence (to not converge with divergence as quickly as (30) initially, but catch-up and overtake once it gets stuck) and, significantly, much lower RMS grey-level error and superior preservation of black levels and (therefore) colour saturation (in a colour display).

Consider, for example, $\Phi_{iu}=1/(\Theta_{iu}+\gamma)$; at the start of the procedure X and R are different so that $\Phi_{iu}$ is of order unity, but as the procedure progresses and R gets smaller and $\Phi_{iu}$ approaches $1/(X_{iu})$ so that the weight automatically changes to provide improved convergence as the procedure progresses. Optionally the weight $\Phi_{iu}$ may also include a colour-dependent term (weighting function), for example to provide better convergence for one colour (say green) than another (say red or blue). This can help match the performance of the procedure, for example measured by RMS error or some other figure of merit, to the characteristics of the human eye. A similar technique can be employed to reduce the noise in greyscale space, by giving additional weight to low luminance components, to which the human eye is disproportionately more sensitive.

It is also possible to re-express the above equations in a simplified form, which facilitates their practical application. In the re-expression below we adopt an alternative nomenclature, in which the input image is given by matrix V with elements $V_{xy}$, and in which R denotes a current row matrix, C a current column matrix, Q a remaining error between V and R·C, p the number of sub-frames, average an average value, and gamma an optional gamma correction function. The variables are initialised as follows:

$$av = \text{average}(\text{gamma}(V_{xy}))$$

$$\text{initial} RC = \sqrt{(av/p)}$$

$$Q_{xy} = \text{gamma}(V_{xy}) - av$$

An embodiment of the NMF system then performs the following calculation for p=1 to the total number of sub-frames:

start $$Q_{xy} = Q_{xy} + R_{py} C_{xp} \text{ for each } x \text{ and } y$$

$$R_{py} = \frac{\text{bias} + \sum_{x} Q_{xy} C_{xp}}{\text{bias} + \sum_{x} C_{xp} C_{xp}} \text{ for each } y$$

-continued $$C_{xp} = \frac{\text{bias} + \sum_{y} Q_{xy} R_{py}}{\text{bias} + \sum_{y} R_{py} R_{py}} \text{ for each } x$$

$$Q_{xy} = Q_{xy} - R_{py} C_{xp} \text{ for each } x \text{ and } y$$

loop to start

The variable bias prevents division by zero, and the values of R and C pull towards this value. A value for bias may be determined by initialRC×weight×no.of.columns where the number of columns is x and the weight is, for example, between 64 and 128.

The above described techniques are applicable to both organic and inorganic LED-based displays. The addressing schemes described have pulse width modulated column drive (time control) on one axis and current division ratio (current control) on the other axis. For inorganic LEDs voltage is proportional to logarithm current (so a product of voltages is given by a sum of the log currents), however for OLEDs there is a quadratic current-voltage dependence. In consequence when the above described techniques are used to drive OLEDs it is important that PWM is employed. This is because even with current control there is a characteristic which defines the voltage across a pixel required for a given current and with only current control the correct voltage for each pixel of a subframe cannot necessarily be applied. The schemes described nonetheless work correctly with OLEDs because rows are driven to achieve the desired current and columns are driven with a PWM time, in effect decoupling the column and row drives, and hence decoupling the voltage and current variables by providing two separate control variables.

Some further optimizations are as follows:

Because current is shared between rows, if the current in one row increases the current in the rest reduces, so preferably (although this is not essential) the reference current and sub-frame time are scaled to compensate. For example, the sub-frame times can be adjusted with the aim of having the peak pixel brightness in each subframe equal (also reducing worst-case/peak-brightness aging). In practice this is limited by the shortest selectable sub-frame time and also by the maximum column drive current, but since the adjustment is only a second order optimisation this is not a problem.

Later sub-frames apply progressively smaller corrections and hence they tend to be overall dimmer whereas the earlier sub-frames tend to be brighter. With PWM drive, rather than always have the start of the PWM cycle an "on" portion of the cycle, the peak current can be reduced by randomly dithering the start of the PWM cycle. In a straightforward practical implementation a similar benefit can be achieved with less complexity by, where the off-time is greater than 50%, starting the "on" portion timing for half the PWM cycles at the end of the available period. This is potentially able to reduce the peak row drive current by 50%.

With rows comprising red (R), green (G) and blue (B) (sub-)pixels (i.e. an RGB, RGB, RGB row pattern), because each (sub-)pixel has different characteristics a given voltage applied to a row may not achieve the exact desired drive currents for each differently coloured OLED (sub-)pixel. It is therefore preferable, in embodiments, to use an OLED display with separately drivable rows of red, green and blue (sub-)pixels (i.e. groups of three rows with respective RRRR..., GGGG... and BBBB... patterns); this type of display configuration can also provide manufacturing advantages.

Embodiments of the invention have been described with specific reference to OLED-based displays. However the techniques described herein are also applicable to other types of display including, but not limited to, vacuum fluorescent displays (VFDs) and plasma display panels (PDPs) and other types of electroluminescent display such as thick and thin (TFEL) film electroluminescent displays, for example iFire® displays, large scale inorganic displays and passive matrix driven displays in general.

The skilled person will recognise that, as previously described, embodiments of the above described methods may be implemented on a dedicated integrated circuit, or by means of a gate array, or in software on a DSP (digital signal processor), or in some combination of these.

The improvement in convergence rate for procedures as described above as compared with a conventional NMF procedure is shown in FIG. 11. It can be seen that the techniques described herein converge, for this example more than an order of magnitude faster than a conventional procedure. It can also be seen from the examples that the techniques described herein begin to converge faster than conventional techniques.

Embodiments of the above described techniques provide image data processing which converges with a full frame MLA solution in only 5-20 steps, producing solutions with as great, or greater, MUX gains, and which furthermore can cope better with text and icon image content than conventional procedures where the number of required iterations can reach 1000.

The speed is, in embodiments, sufficient that real-time video applications can be envisaged. Combining this with a capability to dramatically reduce MUX rate makes possible Passive Matrix TV-sized screens (say 8" and above) with only slightly higher power consumption, and vastly lower cost, than active matrix equivalents. As an example, a 32" diagonal VGA screen may be driven as an MLA passive matrix with only 50% more power consumption than the active matrix equivalent.

No doubt many effective alternatives will occur to the skilled person. For example the image manipulation calculations described above are not dissimilar in their general character to operations performed by consumer electronic imaging devices such as digital cameras and embodiments of the method may be conveniently implemented in such devices.

It will be understood that the invention is not limited to the described embodiments and encompasses modifications apparent to those skilled in the art lying within the spirit and scope of the claims appended hereto.

The invention claimed is:

1. A method of driving a display, comprising a method of digitally processing data in a data array defining a target matrix (X) using non-negative matrix factorization to determine a pair of matrices (F, G), a first matrix of said pair determining a set of features for representing said data, a second matrix of said pair determining weights of said features, such that a product of said first and second matrices approximates said target matrix, the method of digitally processing data comprising:
  inputting said target matrix data (X);
  selecting a row of said one of said first and second matrices and a column of the other of said first and second matrices;
  determining a target contribution (R) of said selected row and column to said target matrix;
  determining, subject to a non-negativity constraint, updated values for said selected row and column from said target contribution; and
  repeating said selecting and determining for the other rows and columns of said first and second matrices until all said rows and columns have been updated.

2. A method of driving a display as claimed in claim 1 wherein said determining of updated values comprises determining a new value for said selected row independent of a previous value of said selected row and determining a new value for said selected column independent of a previous value of said selected column, or comprises determining a new value for a said selected row or column dependent on a weighting factor incorporating a previous value of said selected row or column, said weighting factor determining a degree of convergence of successive iterations of said determining updated values.

3. A method of driving a display as claimed in claim 1, wherein said determining of a target contribution (R) comprises determining a difference between said target matrix (X) and a sum of weighted features determined from all said rows and columns of said first and second matrices except said selected row and column.

4. A method of driving a display as claimed in claim 1, wherein said determining of updated values comprises calculating values of $G_{ia}=f_1(R,F)$ and $F_{au}=f_2(R, G)$ where R is a matrix with I rows and U columns, F is a matrix with A rows and U columns and G is a matrix with I rows and A columns, where $f_1$ and $f_2$ denote first and second functions, and where $G_{ia}$ denotes a data element in the ith row and ath column of G and $F_{au}$ denotes a data element in the ath row and uth column of F.

5. A method of driving a display as claimed in claim 4 wherein $f_1$ and $f_2$ are selected to minimise a cost function measuring a quality of approximation of a product of said selected row and column to said target contribution.

6. A method of driving a display as claimed in claim 5 wherein said cost function comprises a squared Euclidean distance between a product of said selected row and column and said target contribution.

7. A method of driving a display as claimed in claim 5 wherein said cost function comprises a divergence function between a product of said selected row and column and said target contribution.

8. A method of driving a display as claimed in claim 4, wherein $G_{ia}$ and $F_{iu}$ are determined in accordance with:

$$G_{ia} = \frac{\sum_{u=1}^{U} R_{iu} F_{au} \Phi_{iu}}{\sum_{u=1}^{U} F_{au}^2 \Phi_{iu}}, \quad F_{au} = \frac{\sum_{i=1}^{I} G_{ia} R_{iu} \Phi_{iu}}{\sum_{i=1}^{I} G_{ia}^2 \Phi_{iu}}$$

where $R_{iu}$ denotes a data element in the ith row and uth column of R, where R is given by:

$$R_{IU} = X_{IU} - \sum_{n=1}^{A, n \neq a} G_{In} F_{nU}$$

and where $\Phi_{iu}$ denotes a data element in the ith row and uth column of an I by U matrix Φ.

9. A method of driving a display as claimed in claim 8 wherein Φ iu is substantially unity for all i and u.

10. A method of driving a display as claimed in claim 8 wherein $\Phi_{iu}$ has the form $\Phi_{iu}=1/(Z_{iu}+\gamma)$ where $Z_{iu}$ denotes a data element in the ith row and uth column of an I by U matrix dependent upon at least one of X and R, and γ is positive.

11. A method of driving a display as claimed in claim 4, wherein A is less than the smaller of I and U.

12. A method of driving a display as claimed in claim 1, further comprising initialising said first and second matrices.

13. A method of driving a display as claimed in claim 12 wherein said data comprises image data for an image in a time series of images, and wherein said initialising is conditional upon a degree of difference between said image and a previous image.

14. A method of driving a display as claimed in claim 1, wherein said determining subject to a non-negativity constraint comprises setting a said updated value to substantially zero where the updated value would otherwise be negative.

15. A method of driving a display as claimed in claim 1, further comprising constraining said updated values to lie between a minimum and a maximum value.

16. A method of driving a display as claimed in claim 1, further comprising repeating said updating of all said rows and columns of said first and second matrices for a plurality of iterations.

17. A method of driving a display as claimed in claim 1, wherein said data comprises image data defining an image, and wherein said set of features determined by said first matrix comprises a set of subframes which when combined according to said weights determined by said second matrix approximate said image.

18. A method of driving a display as claimed in claim 1 comprising a plurality of pixels arranged in rows and columns, the method comprising employing the method of digital processing defined in claim 1 to process data for display as said target matrix data (X) to determine said first and second matrices (F,G), and driving said display to form an image using a plurality of subframes, each subframe having said rows and columns of pixels driven responsive to a row of one of said first and second matrices and a column of the other of said first and second matrices.

19. A carrier medium carrying processor control code, to, when running, implement the method of claim 1.

20. A computer system configured to implement the method of driving a display as claimed in claim 1, the method comprising inputting said target matrix data (X), the system comprising:
an input for said data for said data array;
an output for outputting said first and second matrices;
data memory for storing said target matrix and said pair of matrices;
program memory storing processor control code; and
a processor coupled to said input, to said output, to said data memory and to said program memory for loading and implementing said processor control code, said code comprising code to, when running implement the method of claim 1.

21. Apparatus for driving a display, the display having a matrix of pixels, said driving comprising digitally processing data in a data array defining a target matrix (X) using non-negative matrix factorization to determine a pair of matrices (F, G), a first matrix of said pair determining a set of features for representing said data, a second matrix of said pair determining weights of said features, such that a product of said first and second matrices approximates said target matrix, the apparatus comprising:
means for inputting said target matrix data (X);
means for selecting a row of said one of said first and second matrices and a column of the other of said first and second matrices;
means for determining a target contribution (R) of said selected row and column to said target matrix;
means for determining, subject to a non-negativity constraint, updated values for said selected row and column from said target contribution; and
means for repeating said selecting and determining for the other rows and columns of said first and second matrices until all said rows and columns have been updated,
wherein each said pixel is addressable by a row electrode and a column electrode;
wherein one of said factor matrices defines row drive signals and the other of said factor matrices defines column drive signals; and wherein said driving comprises driving using said row and column drive signals.

22. A method of driving an electro-optic display, the display having a matrix of pixels, the method comprising:
inputting image data for said matrix of pixels into an image data matrix;
factorizing said image data matrix into a product of first and second factor matrices by employing non-negative matrix factorization; and
driving said display using said factor matrices; and wherein
said factorizing comprising iteratively adjusting said factor matrices such that their product approaches said image data matrix; and wherein
said iterative adjusting comprises adjusting each row of one of said factor matrices and each column of the other of said factor matrices in turn,
wherein each said pixel is addressable by a row electrode and a column electrode;
wherein one of said factor matrices defines row drive signals and the other of said factor matrices defines column drive signals; and wherein said driving comprises driving using said row and column drive signals.

23. A method as claimed in claim 22 wherein said adjusting of a row or column comprises determining a new value for a said row or column independently of a previous value of said row or column, or comprises determining a new value for a said row or column dependent on a weighting factor incorporating a previous value of said row or column, said weighting factor determining a degree of convergence of successive said iterations.

24. A method as claimed in claim 22 wherein said driving comprises driving a plurality of said row electrodes in combination with a plurality of said column electrodes.

25. A method as claimed in claim 22, wherein said driving comprises driving said display with successive sets of said row and column signals to build up a display image, each said set of signals defining a subframe of said display image, said subframes combining to define said display image.

26. A method as claimed in claim 25 wherein said first factor matrix has dimensions determined by a number of said row electrodes and a number of said subframes, and wherein said second factor matrix has dimensions determined by a number of said column electrodes and said number of subframes.

27. A method as claimed in claim 25, wherein a number of said subframes is no greater than the smaller of a number of said row electrodes and a number of said column electrodes.

28. A method as claimed in claim 22, wherein said display comprises a passive matrix OLED display.

29. A method as claimed in claim 22, wherein said display comprises a plasma display.

30. A method as claimed in claim 22, wherein said display comprises an inorganic LED display.

31. A method as claimed in claim 22, wherein said display comprises a liquid crystal display.

32. A carrier medium carrying processor control code, to, when running, implement the method of claim 22.

33. A driver for an electro-optic display, the display having a matrix of pixels, the driver comprising:
- an input to input image data for said matrix of pixels into an image data matrix;
- a matrix factorization system to factorize said image data matrix into a product of first and second factor matrices by employing non-negative factorization; and
- a driver output to drive said display using said factor matrices, and wherein
- said matrix factorization system is configured to iteratively adjust said factor matrices, such that their product approaches said image data matrix, by adjusting each row of one of said factor matrices and each column of the other of said factor matrices in turn.

34. An integrated circuit including the matrix factorization system of claim 33.

35. A method of driving a display, comprising processing a data array defining a target matrix (X) to determine a pair of factor matrices (F,G) such that a product of said factor matrices approximates said target matrix (X), the method comprising:
- determining for a single row or column of a first said factor matrix a value to which an updating rule would converge when iteratively applied, said updating rule comprising an updating rule of a factorizing algorithm which iteratively updates two factor matrices to more closely approximate a target matrix using said updating rule wherein said factorizing comprises non-negative matrix factorization;
- updating said row or column with said determined value;
- repeating said determining and updating for a column or row of a second said factor matrix; and
- repeating said determining and updating of said first and second factor matrices to update each row or column of said first factor matrix and each column or row of said second factor matrix.

36. A carrier carrying processor control code to, when running, implement the method of claim 35.

* * * * *